United States Patent [19]

Tom et al.

[11] Patent Number: 5,037,624

[45] Date of Patent: Aug. 6, 1991

[54] COMPOSITION, APPARATUS, AND PROCESS, FOR SORPTION OF GASEOUS COMPOUNDS OF GROUP II-VII ELEMENTS

[75] Inventors: Glenn M. Tom, New Milford; James V. McManus, Danbury; Bruce A. Luxon, Stamford, all of Conn.

[73] Assignee: Advanced Technology Materials Inc., Danbury, Conn.

[21] Appl. No.: 295,419

[22] Filed: Jan. 10, 1989

Related U.S. Application Data

[60] Continuation-in-part of Ser. No. 163,792, Mar. 3, 1988, Pat. No. 4,983,363, which is a division of Ser. No. 29,632, Mar. 24, 1987, Pat. No. 4,761,395.

[51] Int. Cl.$^5$ ............................................. C07B 63/02
[52] U.S. Cl. ..................................... 423/210; 55/387; 55/388; 422/180; 502/152; 502/157; 502/401; 502/402
[58] Field of Search ............... 422/163, 180; 502/152, 502/157, 401, 402; 423/210, 239, 240, 245.1, 248; 55/387, 388

[56] References Cited

U.S. PATENT DOCUMENTS

| | | | |
|---|---|---|---|
| 3,100,140 | 8/1963 | Ashley et al. | 422/177 |
| 3,477,227 | 11/1969 | Bettega et al. | 422/177 X |
| 4,397,762 | 8/1983 | Johnstone | 526/124 X |
| 4,603,148 | 7/1986 | Tom | 521/31 |
| 4,647,435 | 3/1987 | Nonnenmann | 422/311 X |
| 4,761,395 | 8/1988 | Tom et al. | 502/401 |
| 4,781,900 | 11/1988 | Tom et al. | 502/402 X |

OTHER PUBLICATIONS

K. Isseleib et al., "Alkali-Phosphorverbindugen und ihr Reactives Verhalten XXX Zur P-H—und As-H-Aciditat Primarer und Sekundarer Phosphine bzw. Arsine", J. Organomet. Chem. 3, pp. 84–91, 1965.

*Primary Examiner*—Jill Johnston
*Attorney, Agent, or Firm*—Steven J. Hultquist

[57] ABSTRACT

Scavenger compositions are disclosed, which have utility for effecting the sorptive removal of hazardous gases containing Group II-VII elements of the Periodic Table, such as are widely encountered in the manufacture of semiconducting materials and semiconductor devices. Gas sorption processes including the contacting of Group II-VII gaseous compounds with such scavenger compositions are likewise disclosed, together with critical space velocity contacting conditions pertaining thereto. Further described are gas contacting apparatus, including mesh structures which may be deployed in gas contacting vessels containing such scavenger compositions, to prevent solids from being introduced to or discharged from the contacting vessel in the gas stream undergoing treatment. A reticulate heat transfer structure also is disclosed, for dampening localized exothermic reaction fronts when gas mixtures comprising Group II-VII constituents are contacted with the scavenger compositions in bulk sorption contacting vessels according to the invention.

23 Claims, 5 Drawing Sheets

COMPOSITION, APPARATUS, AND PROCESS, FOR SORPTION OF GASEOUS COMPOUNDS OF GROUP II-VII ELEMENTS

CROSS-REFERENCE TO RELATED APPLICATIONS

This is a continuation-in-part of U.S. application Ser. No. 163,792 filed Mar. 3, 1988 in the names of Glenn M. Tom and Duncan W. Brown, now U.S. Pat. No. 4,983,363 which is a division of U.S. application Ser. No. 029,632 filed Mar. 24, 1987 and now issued as U.S. Pat. No. 4,761,395.

BACKGROUND OF THE INVENTION

1. Field of The Invention

This invention generally relates to gas sorption compositions, apparatus, and associated processes, for effecting the sorptive removal of hazardous gases containing Group II-VII elements of the Periodic Table, such as are widely encountered in the manufacture of semiconducting materials and semiconductor devices.

2. Description of The Related Art

In the manufacture of semiconducting materials and semiconducting devices, a wide variety of hazardous gases are employed or produced, which comprise compounds containing elements from Groups II-VII of the Periodic Table. As used in such context, the term "gases" will be understood to include vapors as well as gases.

The aforementioned hazardous gases may derive from organometallic source reagents employed as precursor materials for the deposition of elemental metals on the semiconductor substrate, as for example by chemical vapor deposition (CVD) techniques. Other hazardous gases are employed in cleaning semiconductor manufacturing equipment such as reactor tubes and susceptors, and/or as etchants for the manufacture of microcircuitry devices.

An illustrative listing of hazardous gas compounds which contain Group II-VII constituent elements and are commonly encountered in the semiconductor industry is set out below.

Group II:
Organic compounds of beryllium, magnesium, zinc, cadmium, and mercury.

Group III:
Organic compounds of aluminum, gallium, and indium; hydrides of boron.

Group IV:
Silane, and chlorosilanes ($SiH_{4-x}Cl_x$, wherein x is an integer whose value is 1 to 4 inclusive); germane; and certain fluorinated etching agents and products.

Group V:
Hydrides of nitrogen, phosphorus, and arsenic; alkyl arsine and alkyl phosphine compounds.

Group VI:
Hydrides of sulfur, selenium, and tellurium; alkyl selenium and alkyl tellurium compounds.

Group VII:
Hydrogen halides (fluoride, chloride, bromide, and iodide).

The aforementioned gaseous compounds occur in widely varying concentrations in semiconductor manufacturing plants, as constituents of vent gases and effluent streams, which due to the hazardous character of these gaseous compounds must be treated to remove such compounds so that they are not released into the environment.

As a result of the foregoing toxicity and safety considerations, considerable effort has been expended in developing compositions and treatment systems for removing such hazardous gaseous compounds and their constituent Group II-VII elements from gaseous effluents which are discharged by semiconductor manufacturing facilities. See, for example, Y. Abe and H. Sugiyama, "Treatments of Semiconductor Manufacturing Plant Exhaust Gases," PPM, 16[6], 40–52 (1985); L. L. Eiger, "Toxic Gas Monitoring for Chemical Vapor Deposition Process Systems," presented at STEP/SEMI Technical Education Programs "Safety Aspects of Effluents From CVD Process Systems," May 23, 1986; E. Flaherty and R. P. Brook man, "Treatments of Gaseous Effluent from Semiconductor Plants," presented at STEP/SEMI Technical Education Programs "Safety Aspects of Effluents From CVD Process Systems," May 23, 1986; and C. Mistry, Y. Ohno, and T. Urata, "Process in Semiconductor Process Exhaust Gas Treatment Technology in Japan," presented at STEP/SEMI Technical Education Programs "Safety Aspects of Effluents From CVD Process Systems," May 23, 1986.

Among the treatment technologies that have come into usage for removal of Group II-VII elements and compounds from semiconductor plant gaseous effluents are combustion, chemical oxidation, and activated carbon treatment of the effluent streams. Each of these treatment methodologies is discussed in turn below.

In the combustion treatment of semiconductor manufacturing effluent gases, "burn boxes" frequently are employed to achieve substantially complete oxidation of the hazardous gases in the effluents. The resulting oxidized products in the combusted effluent gas stream then are trapped by aqueous scrubbing of the gas stream. Such combustion treatment has the significant disadvantage that large volumes of relatively dilute liquid and solid wastes are produced, as combustion by-products. Further, such combustion is very costly, particularly for small-scale semiconductor manufacturing operations.

Chemical oxidation also has been employed to treat semiconductor plant gaseous effluent streams containing Group II-VII constituents, utilizing aqueous oxidizing agents such as acidic potassium permanganate ($KMnO_4$) and sodium hypochlorite, to oxidize arsine, phosphine, silane, and diborane, to yield water soluble materials or precipitates. This treatment methodology also suffers the disadvantage of generating large volumes of dilute waste by-products. In addition, since substantial energy is released in these chemical oxidation reactions, explosive conditions can be created, thereby posing a serious risk of damage and injury in the semiconductor manufacturing plant.

The use of activated carbon beds to physically sorb hazardous Group II-VII constituents from semiconductor manufacturing effluent gas streams is well established (see, for example, F. Ito, M. Kobayashi, T. Abe, "Waste Gas Detoxification," Japanese Kokai Tokkyo Koho JP 61/118117A2 [86/118117], June 5, 1986; M. Sugiyam, S. Kudo, H. Okinori, "Agents for Removing Arsenic Compounds," Japanese Kokai Tokkyo Koho JP 60/238144 A2 [85/238144], Nov. 27, 1985; V. M. Bogdanov, Yu. I. Shumyatskii, O. V. Moiseichuk, Z. A. Suchkova, S. P. Neshumova, V. V. Fedorovskaya, G. I.

Chugunova, "Removal of Impurities of Phosphine and Arsine from Gases," U.S.S.R. SU 1181692 A1, Sept. 30, 1985; and Calgon Carbon Corporation, "Ventsorb® for Industrial Air Purification," Bulletin 23-56b-1986).

Nonetheless, activated carbon treatment in such application suffers the disadvantage that the sorptive affinity of activated carbon for the Group II-VII hazardous gas constituents of the semiconductor manufacturing effluent streams is generally relatively low, under normal effluent process (temperature, pressure) conditions. As a result, very large volumes of activated carbon are required to effectively remove the hazardous gas components, in order to achieve concentrations of such hazardous components in the treated gaseous effluent which are below their Threshold Limit Values (TLV).

To meet TLV effluent standards, then, it frequently is necessary to provide massive beds of activated carbon which, in addition to the considerable capital equipment and operating costs associated therewith, are difficult to effectively control and regenerate for optimum usage of the sorbent material.

In prior copending U.S. patent application Ser. No. 07/163,792 filed Mar. 3, 1988 and prior issued U.S. Pat. No. 4,761,395, the disclosures of which hereby are incorporated by reference herein, there is disclosed a scavenger composition having utility for purifying a gaseous mixture comprising (i) a primary component selected from one or more members of the group consisting of arsine, phosphine, ammonia, and inert gases, and (ii) impurities selected from one or more members of the group consisting of Lewis acids and oxidants. This scavenger composition comprises a support having associated therewith, but not covalently bonded thereto, an anion which is reactive to effect the removal of the impurities from the gaseous mixture, the anion being selected from one or more members of the group consisting of:

(1) carbanions whose corresponding protonated compounds have a $pK_a$ value of from about 22 to about 36; and (2) anions formed by reaction of the carbanions with the primary component of the mixture.

There is a continuing need in the art for improved technology to remove hazardous gases containing Group II-VII constituents, as produced in the manufacture of semiconductor materials and devices. Such need is particularly acute in instances where concentrated reagent gases may be released into the ambient environment as a result of reagent container and/or flow circuitry failure.

An example is the situation arising when a gas cylinder of a reagent such as arsine is connected to a manifold by a regulator which is defective, or in use breaks down, resulting in leakage of arsine to the surrounding air. For such instances, there has not been developed any suitable means of "quenching" the arsine leak in any safe and effective manner. Instead, semiconductor manufacturing workers have been forced to don protective apparel and breathing devices and to place the defective regulator and cylinder unit in an exterior environment, for dilution by and dispersal to the ambient atmosphere, and/or in a bath of aqueous potassium permanganate solution. These expedients are highly undesirable. Ambient air discharge may create health and safety concerns as well as constitute air pollution activity which may be violative of legislative or regulatory constraints on hazardous material emissions. Bulk potassium permanganate contacting i also undesirable, due to the resulting highly exothermic reaction of the arsine with potassium permanganate, and the potential for explosion.

It would therefore be a substantial advance in the art to provide gas sorption compositions which may be usefully employed to efficiently remove Group II-VII gaseous constituents produced in semiconductor manufacturing operations, both in bulk quantities at high concentrations, as well as at lower concentrations from gas mixtures containing such Group II-VII constituents.

Accordingly, it is an object of the present invention to provide improved compositions useful for treating gases which are employed and/or generated in semiconductor manufacturing operations, comprising Group II-VII constituents.

It is another object of the invention to provide improved process technology for treating such semiconductor manufacturing gases by contact thereof with such compositions.

It is a further object of the present invention to provide improved apparatus for treatment of semiconductor manufacturing gases, to remove Group II-VII constituents therefrom, thereby yielding gases depleted in such constituents for discharge as final effluent from the semiconductor manufacturing process system.

It is a still further object of the present invention to provide apparatus for achieving rapid, safe, and substantially complete removal of bulk leakages or other gross volumes of Group II-VII gaseous compounds at high concentrations.

Other objects and advantages of the present invention will be more apparent from the ensuing disclosure and the appended claims.

SUMMARY OF THE INVENTION

The present invention relates in one aspect to gas sorption compositions comprising active scavengers which are effective for removing Group II-VII gaseous constituents, either in single component (pure) form or from gas mixtures containing same.

Mechanistically, these gas sorption compositions comprise active scavengers which effect removal of the Group II-VII constituents by nucleophilic substitution, deprotonation, and/or oxidation modes of reaction. Depending on the type and multiplicity of such Group II-VII constituents encountered in the gas sought to be treated, it may be desirable in a given application to utilize specific scavengers in combination with one another, to effect sequential or concurrent scavenging treatment of the gas to remove its Group II-VII constituents.

The nucleophilic substitution scavenging reactions may be carried out with suitable scavenging species, as hereinafter more fully described, to form adducts between metals and electron donating compounds.

The deprotonation scavenging reactions may be carried out with strong base species as the active scavengers, to deprotonate hydrogen-containing Group II--VII hazardous gas compounds, using a carbanion source compound whose cationic moiety then forms a non-volatile product by reaction with the deprotonated constituent. For example, in the case of ammonia as a basic hazardous gas constituent, the deprotonation of supported sulfonic acids to form quaternary ammonium complexes achieves a rapid and efficient removal of the ammonia gaseous constituent.

Oxidation reactions, including those effected by oxidizing scavengers such as potassium permaganate, may be employed to effect residual clean-up of hazardous gas constituents, subsequent to scavenging via nucleophilic substitution reactions and/or deprotonation reactions, to achieve concentrations of the hazardous gas constituents in the final treated gas stream which are substantially below TLV levels.

Such final stage oxidation reaction treatment of the hazardous gas mixture avoids the disadvantages associated with the prior art use of chemical oxidants such as potassium permaganate, since the upstream treatment by nucleophilic substitution and/or deprotonation reactions will reduce the residual concentrations of the hazardous gas constituents to low levels, thereby minimizing the risk of explosion hazard and runaway exotherms which may otherwise be associated with the high heat of reaction of the chemical oxidation scavenging reaction.

A variety of scavenger compositions according to the present invention, in the foregoing scavenger classifications, are hereinafter described in detail.

In a process aspect, the present invention relates to contacting gases comprising Group II-VII constituents, with scavengers of the types described above, preferably under specified critical space velocity contacting conditions, as hereinafter more fully described.

In an apparatus aspect, the present invention relates to gas contacting vessels comprising beds of the above-described scavenger compositions.

In a specific apparatus embodiment, the present invention relates to a gas mixture contacting vessel containing a bed of a scavenger, including gas inlet and outlet flow ports having operatively associated therewith means for containment of the scavenger solids in the vessel. Such solids retention means comprises a mesh structure including an axially accordion-pleated mesh cylindrical body, preferably comprising a series of axially spaced, circumferentially continuous, radially entrant folds.

This retention means provides a substantial surface area density, measured as mesh structure surface area per unit volume of the mesh structure, which in turn affords a high resistance to entrainment of scavenger solids in the gas discharged from the vessel subsequent to treatment thereof, or to introduction of spurious entrained solids in the influent gas introduced to the vessel via the inlet port, depending on whether the mesh structure is deployed at the outlet or inlet port of the vessel. Further, it may be advantageous in some instances to coat the mesh structure itself with a suitable scavenger material, or to form the mesh of a suitable material of construction having intrinsic scavenging properties.

In a related aspect, the invention relates to mesh structures per se, of the type described above.

A further aspect of the invention relates to a check valve for a gas contacting vessel of the type described above, wherein the valve comprises a valve body having an axial flow passage defining a cavity in the valve body, with a sealing gasket reposed in the cavity at one end thereof, and a spring-biased poppet positioned in the cavity to bear compressively against the sealing gasket.

In another aspect, the present invention relates to a gas sorption apparatus for bulk scavenging of Group II-VII gaseous constituents at high concentrations, such as may result from equipment leakage, or inadvertent discharge of bulk quantities of reagent gases, in the semiconductor manufacturing plant. Such gas sorption apparatus comprises a bed of appropriate scavenger material, with means for coupling the scavenger bed in gas contacting communication with the gas comprising the Group II-VII constituent(s).

In one specific aspect, such gas scavenging apparatus comprises a reticulate heat transfer structure in a scavenger vessel, in which the scavenger bed is contained. The reticulate heat transfer structure is in thermal contact with the scavenger vessel, and provides a substantial extent of surface area in contact with the scavenger bed, for axially dampening the exothermic reaction front which otherwise would cause a high temperature zone to be substantially localized at a specific longitudinal position, over the entire associated transverse cross-section of the bed. In such context, the terms "axial" and "axially" refer to the direction of gas flow through the bed.

The provision of a reticulate heat transfer structure in the scavenging vessel has been determined to provide a substantial and unexpected redistribution of heat from the exothermic scavenging reaction over the bulk volume of the bed, thereby avoiding the formation of excessive "hot spots" which otherwise would occur in the absence of the reticulate heat transfer structure. It has been found, for example, that the temperature gradient produced by sorption of the Group II-VII gaseous contaminant(s) on the scavenger can be reduced by as much as a factor of 10 relative to the temperature gradients which would occur in the absence of the reticulate heat transfer structure, when utilizing a reticulate heat transfer structure which is only 5% by weight of the total weight of the scavenger bed.

The reticulate heat transfer structure may for example comprise an axially continuous structure which has a cross-section of spiral form, or a cross-section characterized by a plurality of vanes radiating from a central axis outwardly to the radial periphery of the scavenger bed. For example, the reticulate heat transfer structure may be arranged so that no point in any transverse cross-section of the bed is more than 180° in arc length, or more than one-half the radial distance of the bed, from a heat transfer surface of the reticulate heat transfer structure. As used herein, the term "reticulate" means that the heat transfer structure is perforate or foraminous in character.

Other aspects and features of the present invention are described hereinafter in greater detail.

DETAILED DESCRIPTION OF THE INVENTION, AND PREFERRED EMBODIMENTS THEREOF

Figure 1:
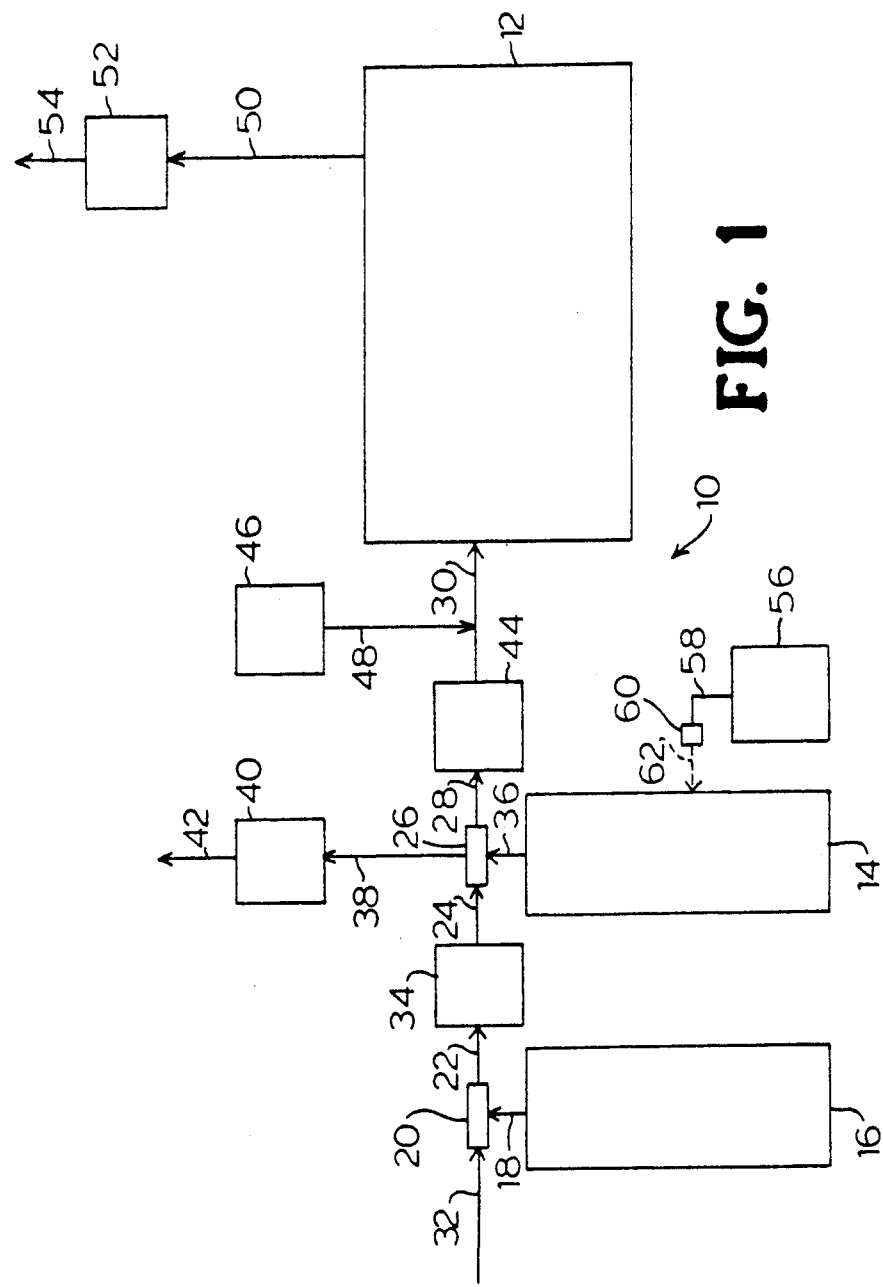
FIG. 1 is a schematic flow sheet of a semiconductor manufacturing process system employing chemical vapor deposition for coating a semiconductor substrate, wherein an organometallic reagent is employed as a source of the deposited material.

The active scavenger compositions of the present invention, as variously described hereinafter, may be usefully employed in the removal of Group II-VII constituents of gases or gas mixtures comprising same. Such gases and gas mixtures, as indicated, are typically produced in semiconductor manufacturing operations, in which Group II-VII constituents are present in process gas streams in widely varying concentrations. As used in this context, the term "Group II-VII constituents" refers to gases deriving from volatile compounds containing Group II-VII elements of the Periodic Table, as well as to the Group II-VII elements themselves. Illustrative examples include gaseous alkyl compounds, e.g., dimethylarsine, t-butylarsine, in which at least one hydrogen is bound to the metal atom. The specific scavenger compositions useful in Group II-VII constituent removal will of course depend on the specific constituents to be removed, and the TLV and other related effluent concentration criteria for the specific process system which is considered.

The reaction mechanisms which are usefully applied in the practice of the present invention, utilizing the scavenger materials hereinafter more fully described, include nucelophilic substitution, deprotonation, and chemical oxidation, the latter being useful primarily as a final stage processing reaction to insure that residual concentrations of the Group II-VII constituents in the final effluent from the process system are reduced to extremely low levels. Each of these three forms of reactive removal of Group II-VII constituents is discussed in turn below.

Nucleophilic substitution reactions may be carried out utilizing scavenger compositions of the present invention to remove Group II-VII constituents from gases and gas mixtures such as semiconductor manufacturing process streams. Such nucleophilic substitution reactions involve the formation of adducts by metals and electron donating (nucleophilic) compounds, in the gas contacting system in which the process gas is contacted with a scavenger.

The scavenger compositions which may be usefully employed to carry out such nucleophilic substitution reactions to remove Group II-VII constituents from gases and gas mixtures comprising same, may suitably comprise a support having associated therewith, or covalently bonded thereto, metal moieties such as lithium, potassium, sodium, magnesium, and/or zinc, in a functional form which is reactive to form the adduct by reaction with the Group II-VII consitutent. A preferred scavenger composition for such purpose, which has particular utility for removing Group II alkyl compounds, Group III alkyl compounds, and Group IV compounds, comprises polyvinyl phenoxy metal compounds, such as polyvinyl phenoxy lithium, on a suitable support. Lithium is a preferred scavenger metal constituent for such purpose, although other alkali metals as well as alkaline earth metals, may potentially be useful. It is to be recognized that other lithoxy scavenger compounds, may also be potentially useful in such application. Such lithoxy compounds may suitably include compounds of the formula LiOR', wherein R' is a polymeric backbone, or other chemical moiety imparting to the scavenger the ability to form an adduct with the gas constituent having a suitably low vapor pressure, preferably substantially less than one part per million (ppm).

Utilizing lithium scavenger compositions of the formula LiOR' as examples, the nucleophilic substitution adduct formation reactions, for illustrative trialkylaluminum and silane waste gas constituents, are as follows:

$$R_3Al + LiOR' \rightarrow Li^+ [R_3AlOR']^- \tag{1}$$

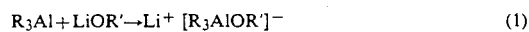

$$SiH_4 + LiOR' \rightarrow SiH_3OR' + LiH \tag{2}$$

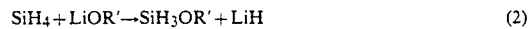

If the OR' group in the lithoxy scavenger is polymeric, such as the preferred polyvinyl phenoxy moiety, the vapor pressures of the respective aluminum and silicon adducts will be effectively zero.

When employing the above-described scavenger compositions to effect nucleophilic substitution reactions and form adducts from the waste gas constituents, it is important, from the standpoint of maximizing the effective use of the scavenger, to employ the scavenger in beds appropriate size. Such beds typically are provided in a containment vessel which is equipped with respective inlet and outlet ports, by which the impurity-containing gas mixture is introduced to the bed and impurity-depleted gas mixtures are discharged from the bed, respectively. As used in such context, the term "impurity" refers to Group II-VII constituents.

In order to provide beds of scavenger for such gas contacting which are of appropriate size, the beds must be designed so that their critical space velocity is within appropriate limits. As used herein, "critical space velocity" is the ratio of the volumetric flow rate of gas mixture contacted with the scavenger to the volume of scavenger bed, at a point at which the scavenger volume becomes too small to effect removal of the impurities at a selected minimum leakage (substantially zero) level.

For the aforementioned scavenger compositions effecting nucleophilic substitution reactions resulting in adduct formation to remove the waste gas impurities, the critical space velocity of the scavenger bed must be greater than about 1,000 volumes of gas per volume of bed per hour. Adherence to this design criterion will insure that the scavenger beds are not excessively sized.

Another class of scavenger compositions according to the present invention comprises active scavenger species which effect removal of Group II-VII constituents from gases containing same, by deprotonating the undesired compounds, yielding low vapor pressure reaction products comprising the deprotonated constituents. Strong bases may be employed as the scavengers, as source compounds for carbanions for deprotonating the specific Group II-VII constituent(s) sought to be removed.

Scavenger compositions of such type may suitably comprise a support having associated therewith, or covalently bonded thereto, organometallic compound(s) selected from the group consisting of compounds of the formulae:

(i) RM,
wherein:
R is alkyl; and
M is selected from the group consisting of lithium, sodium and potassium;

(ii) $R_{2-a}M_2X_a$,
wherein:
R is alkyl;
M is selected from the group consisting of magnesium and zinc;
X is halide; and
a is a number between 0 and 1, inclusive;

(iii) $R_{3-b}AlX_b$,
wherein:
R is alkyl;
X is halide; and
b is a number between 0 and 2, inclusive.

A preferred class of carbanion source compounds includes organometallic compounds such as alkyllithium, alkylsodium, alkylpotassium, dialkylmagnesium, alkylmagnesium halide, dialkylzinc, alkylzine halide, trialkylaluminum, dialkylaluminum halide, and alkylaluminum dihalide, wherein the alkyl radical contains 1–12, and preferably 1–8, carbon atoms. Particularly preferred organometallic compounds for such purpose are dibutylmagnesium and butyllithium.

Alkyl or dialkyl metal compounds are a most preferred class, although it will be recognized that other metal containing carbanion source compounds may be employed, of the formula MA, where M is a metal moiety such as lithium, sodium, potassium, alkylmagnesium, or alkylzinc; and A is a carbanion. In practice, butyl carbanions have been employed to good effect, and are preferred alkyl carbanion constituents.

Table I below shows $pK_a$ deprotonation equilibrium constants ($K_{eq}$) for selected compounds, to illustrate the selection criteria for the carbanion species and carbanion source compounds which may be usefully employed in scavengers, to effect removal of Group II–VII constituents by deprotonation reactions.

TABLE I

| Compound | $pK_a^{1,2}$ | log $K_{eq}^3$ |
|---|---|---|
| Bu—H | 42 | 0 |
| Me—H | 40 | 2 |
| H—H | 37 | 5 |
| $C_6H_5$—H | 37 | 5 |
| $NH_2$—H | 37 | 5 |
| $PH_2$—H | 28 | 14 |
| $AsH_2$—H | 26 | 16 |
| HO—H | 15 | 27 |
| H—F | 3 | 39 |
| $RSO_3$—H | −7 | 49 |
| H—Cl | −7 | 49 |
| H—I | −10 | 52 |

[1] K. Issleib and R. Kummel, "Alkali-Phosphorverbindungen und ihr Reaktives Verhalten XXX. Zur P-H- und As-H-Aciditat Primarer und Sekundarer Phosphine bzw. Arsine," J. Organomet. Chem. 3, 84–91 1965.
[2] A. J. Gordon and R. A. Ford, "The Chemist's Companion," John Wiley & Sons, New York, pp. 62–63 (1972).
[3] Measured between the butane and second chemical species' $pK_a$.

The $pK_a$ value is the negative logarithm of the acidity constant of a given material, so that increasing values of $pK_a$ indicate increasing basicity. As used herein, the $pK_a$ value of a compound refers to the $pK_a$ numerical value determined in accordance with the procedure described in A. Streitwieser and J. H. Hammons, Prog. Phys. Org. Chem., 3, 41 (1965), in a solvent medium in which fluorene and diphenylmethane, as reference compounds, have $pK_a$ values of about 22.6 and 34.1, respectively.

With reference to the compounds illustratively tabulated in Table I, the deprotonation reaction will be kinetically fast for those species having log $K_{eq}$ values in the range of 10 and above. Accordingly, the deprotonation reactions will be kinetically fast for those species from phosphine ($PH_3$) and below in Table I.

As indicated, a preferred carbanion source compound is dibutyl magnesium ($Bu_2Mg$). Using this source compound as an illustrative scavenger species, the deprotonation reactions can be effectively carried out for Group V hydride compounds such as arsine and phosphine (but less effectively with ammonia), as well as for Group VI and Group VII compounds, including hydrides of sulfur, selenium, and tellurium, and hydrogen halides whose halo moiety is chlorine, bromine, iodine, or fluorine.

Typical deprotonation reactions for the foregoing groups are exemplified below.

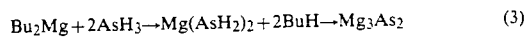  (3)

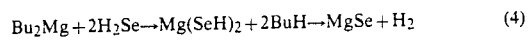  (4)

  (5)

wherein Bu is butyl.

As shown by the foregoing reactions, the deprotonized impurity species in each of the above reactions is ultimately bound to the metal cation ($Mg^{++}$) in the reaction product. Such reaction products have negligible vapor pressure. Accordingly, the gas mixture contacted with the scavenger in such deprotonation reactions will produce a gaseous effluent which is substantially completely depleted in the Group V–VII impurity.

As mentioned above, the deprotonation reaction of ammonia with the scavenger compound dibutyl magnesium does not achieve a high removal of the impurity constituent, relative to the removal levels which are achieved by such scavenger compound with respect to the other hydrides of Group V (viz., phosphorus and arsenic hydrides), or to Group V hydrides or to Group VII hydrogen halides.

In the case of ammonia as the impurity constituent of the gas mixture sought to be treated, it is advantageous to utilize as the active scavenger a strong acid. The use of suitable strong acids is likewise advantageous for other basic impurity constituents in the gas mixture. Sulfonic acids are particularly preferred as active scavenger species for removal of ammonia from gases containing same. The equilibrium constant, $K_{eq}$, for this reaction, by which the waste gas ammonia is reacted with the sulfonic acid scavenger to form a quaternary ammonia complex,

  (6)

wherein R is a monovalent radical or other anchoring moiety such as a polymeric backbone structure, is about $10^{17}$. As a result of this high equilibrium constant for the reaction, ammonia will be effectively and substantially completely stripped from the gas contacted with the sulfonic acid active scavenger component.

With regard to the removal of Group II-VII constituents from gases and gas mixtures comprising same, by flowing the impurity-containing gas through a bed of the scavenger material to effect deprotonation reactions, the critical space velocity of the scavenger bed should be greater than 1,000 volumes of gas mixture per volume of scavenger bed per hour, to properly size the scavenger bed and avoid a bed of excessive size.

Impurity removal of Group II-VII constituents from gases comprising same, also may be carried out by chemical oxidation reactions, with the exception of some of the Group VII acids. Among the oxidizing materials which may advantageously be employed as active scavenger materials are lead oxide ($PbO_2$) and alkali metal permanganates of the formula $MMnO_4$, wherein M is an alkali metal.

A preferred oxidizing scavenger is potassium permanganate, $KMnO_4$. This scavenger compound effects a kinetically fast oxidation reaction with the Group II-VII compounds generally encountered in semiconductor manufacturing waste gases, with the aforementioned exception of certain Group VII acids. Due to its high oxidation potential, potassium permanganate is thermodynamically capable of efficient removal of the aforementioned gaseous impurities, but it has a low capacity, and, as indicated herein earlier, entails the potential risk of explosive reactions. Accordingly, the potassium permanganate scavenger preferably is employed in a final stage of a multi-stage treatment system, wherein upstream treatment of the Group II-VII impurity-containing gas mixture is carried out utilizing nucleophilic substitution and/or deprotonation scavenging reactions.

As a final treatment, oxidation with potassium permanganate effects removal of traces of the hazardous gaseous materials that escape scavenging in the upstream treatment steps, providing a high rate of reaction to achieve substantially complete removal of these undesired impurity constituents. Inasmuch as it is employed downstream of the main scavenger treatment, the explosion hazard will be correspondingly reduced because the concentrations of the toxic gaseous components will be low.

From a design standpoint, the scavenger bed of potassium permanganate or other alkali metal permanganate scavenger should be at least 5,000 volumes of gas mixture per volume of bed per hour, in order to provide appropriately sized scavenger beds.

The aforementioned active scavenger materials are suitably associated with, or covalently or ionically bonded to, support substrate materials to form the scavenger compositions of the present invention. If the active scavenging species is not covalently or ionically bonded to the support substrate, it may be associated with the support in any suitable manner. For example, the active scavenging species may be dispersed throughout the support matrix in the form of particulates or agglomerates, as a film or plating on the support, or otherwise localized in pores of a porous support. The specific choice of support material, and the form of the active scavenging species and its method of disposition on the substrate, may be varied widely depending on the specific active scavenging species and support materials employed.

The supports useful in the scavengers of the present invention include any suitable materials which are compatible with the gas mixtures being purified, and the reaction products of the impurity removal, and any intermediates involved with conditioning or otherwise preparing the scavenger, and which are stable under the conditions of use. The support should have sufficiently high temperature and chemical stability and porosity characteristics. The stability criteria are important for maintaining the integrity of the scavenger composition during the pyrolysis phase of synthesis operations and with the reagents utilized during the synthesis and in the gas stream of interest. The maximum temperatures that are likely to be encountered are in the range of 200° C. to 300° C. The reagents employed in the synthesis operation are likely to be strongly reducing in character. The support typically must be stable to both strongly acidic and strongly basic reagents.

Illustrative materials which may be potentially useful in the broad practice of the invention include materials such as aluminosilicates, alumina, silica, kieselguhr, activated carbon, metal fluorides, and fluorocarbon polymers. As used herein, the term "aluminosilicates" means a support composition including the elements aluminum, silicon, and oxygen, such as molecular sieves; such aluminosilicates may be natural or synthetic in character.

The preferred characteristics of supports which are useful for scavengers of the invention include (a) high surface area, for example a surface area in the range of from about 50 to about 1000 square meters per gram of support, (b) high porosity, such as a significant porosity from pores of a diameter in the range of from about 3 to about 200 Angstroms, and (c) good thermal stability, e.g., thermally stable at temperatures up to about 300 degrees Centigrade.

The scavengers of the invention may be readily formed into a bed through which gas is flowed, thereby providing a highly efficient removal system for substantially eliminating Group II-VII gaseous constituents.

The capacity of the bed for removing Group II-VII gases may of course be readily adjusted to a particular desired level by controlling the loading of the scavenger moiety on the support, in the impregnation or other fabrication step by which the active scavenger species is applied to the support.

Preferred supports in the broad practice of the invention include aluminas, silicas, molecular sieves, and other aluminosilicates.

There is a special requirement for the support material when hydrogen fluoride or hydrogen fluoride-producing gas streams are being treated. In such case, common metal oxides are attacked by the hydrogen fluoride and undergo severe hydrolysis. Accordingly, in such gas treatment environment, the support suitably is varied from the otherwise preferred support materials; in these applications, metal fluorides or porous fluorinated polymers such as polytetrafluoroethylene (PTFE) are advantageously employed as the support materials.

Set out below is an illustrative listing of preferred scavenger compositions for selected Group 11-VII gaseous compounds which frequently are present in semiconductor manufacturing plant environments and in process gas streams and effluent gases.

Group II Alkyl Compounds

Group II alkyl compounds can be removed from gases comprising same by a scavenger composition comprising polyvinylphenoxylithium as the active scavenging species, on an alumina support. Such preferred scavenger composition may optionally be employed in combination with a further secondary treatment scavenger composition, comprising potassium permanganate as the active scavenging species, on an alumina support. In general, however, it is unnecessary to employ such final potassium permanganate scavenging, if the polyvinylphenoxylithium scavenger is provided in sufficient quantity in an appropriately sized bed.

Group III Alkyl Compounds

A preferred scavenger composition for Group III alkyl compound removal from gases comprising same, includes polyvinylphenoxylithium as the active scavenger species, on an alumina support.

Group IV Compounds

The preferred scavenger composition for this class of compounds comprises polyvinylphenoxylithium as the active scavenger species, on an alumina support. This scavenger is particularly useful for reducing the concentration of silane and chlorinated silane gases to very low final effluent levels.

Group V Hydrides

Arsine, phosphine, alkylarsine, and alkylphosphine gaseous constituents are scavenged effectively by a dibutylmagnesium active scavenging species on an alumina support. Such a scavenger composition is capable of reducing arsine concentration in an influent gas mixture containing 100,000 parts per million arsine, to a final effluent concentration on the order of about 200 parts per million. If desirable, the use of a further scavenging treatment utilizing potassium permanganate as the active scavenging species on an alumina support effectively reduces the residual arsine concentration in the final effluent gas to less than the TLV, 0.05 parts per million.

Ammonia may effectively be scavenged from gases comprising same by non-volatile acid groups such as sulfonic acid groups, which preferably are provided as pendant groups on a suitable polymeric support matrix. Alternatively, the scavenging acid groups may be supported on a suitable inert support such as alumina. A suitable scavenger composition for such purpose includes as a support a polystyrene-divinylbenzene resin, with the sulfonic acid constituent comprising sulfonic acid or sulfonate anion radicals, as substituents on aromatic rings of the polystyrene-divinylbenzene resin. In general, the $pK_a$ value of the active scavenging species (acid groups) should be less than about 1, to achieve a reasonably complete removal of ammonia from the gas stream being treated. The non-volatile acid group effects removal of the ammonia from the gas stream by the following reaction $$HY + NH_3 \rightarrow NH_4^+ Y^- \tag{7}$$

Group VI Compounds

The hydridic compounds of the Group VI elements, viz., hydrogen sulfide, hydrogen selenide, and hydrogen telluride, are effectively completely removed from gases comprising same, via contacting with the dibutyl magnesium active scavenging species, on an alumina support.

Group VII Compounds

Hydrogen halides (the halo moiety of which is fluorine, chlorine, bromine, or iodine) are effectively removed from gases containing same, by contact of the gas with dibutyl magnesium as the active scavenging species. For hydrogen halides wherein the halo moiety is chlorine, bromine, or iodine, a preferred support material is alumina, while in applications requiring removal of hydrogen fluoride, the support preferably is a material such as calcium fluoride ($CaF_2$).

Referring now to FIG. 1, there is shown an illustrative schematic flow sheet for a chemical vapor deposition (CVD) process system 10, for delivering an organometallic reagent to a CVD coating chamber along with a dopant material.

The process system 10 as illustrated comprises a CVD chamber 12 in which a part to be coated (not shown) is mounted or otherwise positioned in a conventional manner. The organometallic material employed in the coating process is provided by a source means 14. Such organometallic material source means may comprise a conventional gas cylinder containing the organometallic reagent, as for example arsine, or alternatively, the source means may comprise apparatus for generating the organometallic reagent in situ.

In order to provide the organometallic reagent from source means 14 at a desired concentration at the substrate to be coated in CVD chamber 12, a carrier gas supply means 16 is provided upstream of the organometallic reagent source means 14.

The carrier gas supply means 16 provides carrier gas, such as hydrogen, nitrogen, or argon, to the feed line 18, which is joined to the manifold connector 20 for flow through the manifold circuit comprising connector 20, line 22, line 24, connector 26, line 28, and line 30, to the CVD chamber 12.

The manifold connector 20 also is joined to line 32 for introduction of a purge gas from a suitable source of same (not shown) into the manifold flow circuit to purge same and the CVD chamber, in a known manner. Accordingly, the manifold coupling 20 may comprise suitable gas flow control and valve means to selectively open the manifold flow circuit to flows of the carrier gas from carrier gas supply means 16 at a predetermined rate, or to alternatively close the manifold flow circuit to flow of carrier gas from the carrier gas supply means 16, and to open the flow circuit to flow of purge gas from line 32, as desired.

The manifold flow circuit has disposed therein, between lines 22 and 24, a carrier gas purifier 34, which may for example be of the type disclosed and claimed in U.S. Pat. Nos. 4,723,967 and 4,738,693.

The organometallic reagent source means 14 is joined in flow control relationship with coupling 26 by line 36. Coupling 26 also has joined thereto line 38, which in turn is joined to scrubber 40. This scrubber may comprise a scavenger vessel and composition of the present invention, and is connected to vent gas discharge line 42.

Disposed in the manifold flow circuit between lines 28 and 30 is a purifier 44 which may be of a same or similar type as purifier 34, with respect to the apparatus character thereof. Dopant source means 46 is joined to CVD chamber feed line 30 by line 48.

The CVD chamber 12 is joined by effluent gas line 50 to effluent gas scrubber 52. The effluent gas scrubber 52 in turn is joined to exhaust gas discharge line 54.

The effluent gas scrubber 52 may suitably comprise a scavenger apparatus and composition according to the present invention.

Associated with the organometallic reagent source means 14 is a bulk scavenger vessel 56, to which is joined a gas flow line 58 and coupling 60, for placing the bulk scavenger vessel 56 in effective scavenging relationship to organometallic reagent gases deriving from the organometallic reagent source means 14 (such gas flow communication relationship being indicated by the dotted line 62 in FIG. 1).

In operation of the CVD process system illustrated in FIG. 1, carrier gas is flowed from carrier gas source means 16 through line 18 and manifold coupling 20 to line 22, for passage therefrom through purifier vessel 34. This purifier vessel may contain a scavenger or other sorbent material, as for example in the form of a contacting bed, to effect removal of any impurities, such as water and other Lewis acid and oxidant impurities, and to provide a carrier gas of high purity. The purified carrier gas then is discharged from the purifier vessel 34 into line 24 to coupling 26, which also is connected to line 36 for introduction of the organometallic reagent source gas from source means 14 into the manifold flow circuit.

As indicated, the coupling 26 may suitably comprise flow control means, including valves and monitoring devices, to insure that a precise selected concentration of the organometallic reagent is added to the carrier gas to form the CVD source gas mixture.

This CVD source gas mixture then flows in line 28 to the purifier vessel 44, which may for example contain a bed of a scavenger effective for removing impurities deriving from the gas as originally supplied from the organometallic reagent source means 14, together with any residual impurity deriving from the carrier gas.

As an illustrative example, if the organometallic reagent provided by the source means 14 is arsine, the purifier vessel 44 may suitably contain a scavenger composition of the type disclosed and claimed in U.S. Pat. No. 4,761,395 of G. M. Tom and D. W. Brown, to remove Lewis acid and oxidant impurities from the CVD source gas, and produce a purified CVD source gas which flows from the purifier 44 in CVD chamber feed line 30 to the CVD chamber 12.

In line 30, the CVD source gas may have introduced thereto a dopant constituent supplied from dopant source means 46 via dopant feed line 48.

Dopant feed line 48 may have associated therewith suitable flow regulating and monitoring means, such as valves (not shown) to precisely control the concentration of dopant constituent in the CVD source gas flowed to the CVD chamber from line 30.

In the CVD chamber, a substrate article such as a silicon or gallium arsenide wafer may be coated with thin film layers of the metal consitutent of the organometallic source reagent under appropriate CVD process conditions, as is well known in the semiconductor manufacturing art.

The waste gas mixture from the CVD process, depleted in the constituents deposited on the substrate in the CVD chamber, and containing reaction products deriving from the chemical vapor and the elevated temperature conditions of the process, is discharged from the CVD chamber in effluent gas discharge line 50. From this line, the discharged gas flows through waste gas scrubber vessel 52, which may comprise a scavenger vessel and composition according to the present invention. The effluent gas mixture from the CVD process is contacted in the scavenger vessel 52 with the scavenger composition, to remove the Group II–VII constituents of the effluent gas mixture and yield a treated waste gas stream depleted in such constituents, which is discharged from the process system in waste gas discharge line 54.

The bulk gas scrubber vessel 56, which may be constructed in accordance with the present invention as more fully disclosed hereinafter, and containing a scavenger composition of the present invention, is provided to remove bulk amounts of gas comprising or contaminated with the organometallic reagent deriving from the organometallic source means 14.

As discussed hereinabove, it is not an uncommon occurrence in semiconductor manufacturing operations for regulators, flow controllers, pressure gauges, manifold connections, etc., which are associated with organometallic reagent source gas cylinders to leak, or for the cylinders themselves to leak (e.g., as a result of a defective cylinder head), resulting in the hazardous organometallic reagent contaminating the ambient atmosphere. For this reason, organometallic reagent source gas cylinders typically are deployed in so-called gas cabinets in semiconductor manufacturing facilities, so that such cylinders and the associated flow circuitry and control elements are isolated from semiconductor manufacturing workers, and other portions of the semiconductor manufacturing process system.

In such gas cabinets, suitable monitoring means may be disposed, to detect the occurrence of leakages of the reagent gas, but such expedient merely provides for initial containment of the leaking gas, which must still be dealt with, insofar as its bulk presence in the gas cabinet, and the need for removal thereof, are concerned. As previously indicated herein, the prior art practice of immersing a leaking cylinder or cylinder assembly in an aqueous solution of chemical oxidizing material such as potassium permanganate is frequently impractical, and carries with it the risk of creating explosive conditions, and of large and potentially runaway exotherms.

Accordingly, it is an aspect of the present to provide a bulk gas removal apparatus which may be deployed in proximity to the gas cylinder or other reagent source means, and coupled therewith to effect a rapid and safe removal of the hazardous gas. Such bulk gas removal apparatus is described in greater detail hereinafter.

After the CVD process has been carried out to coat the CVD article in CVD chamber 12, it then is frequently necessary to purge the manifold flow circuit of the previously employed carrier gas, and reagent components, to render the CVD process system amenable to subsequent operation with other CVD source gas mixtures. For such purpose, it may be desirable to purge the manifold flow circuit by flow of gas therefrom into line 38, for contacting with a suitable scavenger in scrubber 40, and discharge of the resulting impurity-depleted vent gas in line 42.

Accordingly, the coupling 26 may have associated therewith suitable flow control, valve, and related means to effect such post-CVD process purging of the manifold flow circuit. Such purging may include introduction of a suitable purge gas to the manifold flow circuit in line 32, with the CVD chamber 12 isolated from the manifold flow circuit during such purging operation, and with closure of suitable valves (not shown) in the portion of the manifold flow circuit coupled to the CVD chamber 12.

Thus, the semiconductor manufacturing process system schematically illustrated in FIG. 1 represents a fully integrated process system with respect to containment, treatment, and substantially negligible discharge of Group II-VII constituents generated or otherwise present in the semiconductor manufacturing operation.

It will be appreciated from the foregoing description of the operation of the FIG. 1 CVD process system that the scavenger materials in the respective vessels 40, 52, and 56 may be the same or different, relative to one another, and if the same, may be of differing capacity, to accommodate the concentrations of the Group II-VII constituents which it is desired to remove in the respective vessels.

Thus, the scavenger vessel 56 must be appropriately sized and provided with a scavenger composition of adequate capacity to effectively remove a very high concentration of the source gas from source gas means 14. Purifier vessel 40 must be appropriately sized and provided with a scavenger material of suitable capacity to accommodate Group II-VII constituent concentrations which are significantly lower than those for which the scavenger vessel 56 encounters (owing to the carrier gas which is present with the CVD source reagent in line 38). Scavenger vessel 53 is appropriately sized and provided with a scavenger material of a suitable capacity to accommodate the relatively dilute concentrations of Group II-VII constituents which are encountered in the effluent gas mixture discharged from the CVD chamber in line 50, such concentrations being significantly lower than the concentrations of the same gas constituents which are encountered by the scavenger in scavenger vessel 40.

Figure 2A:
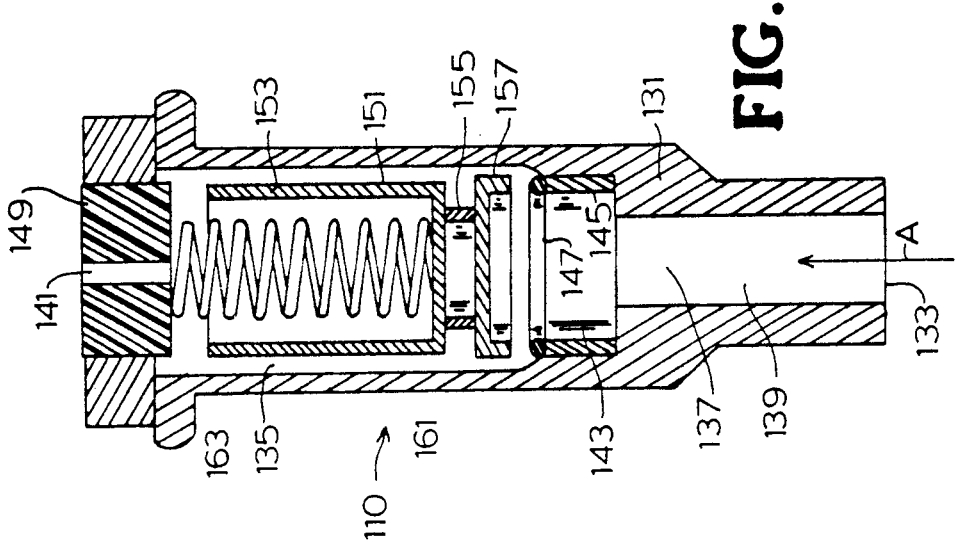
FIG. 2A is a sectional elevation view of the check valve of the FIG. 2 apparatus.
Figure 2:
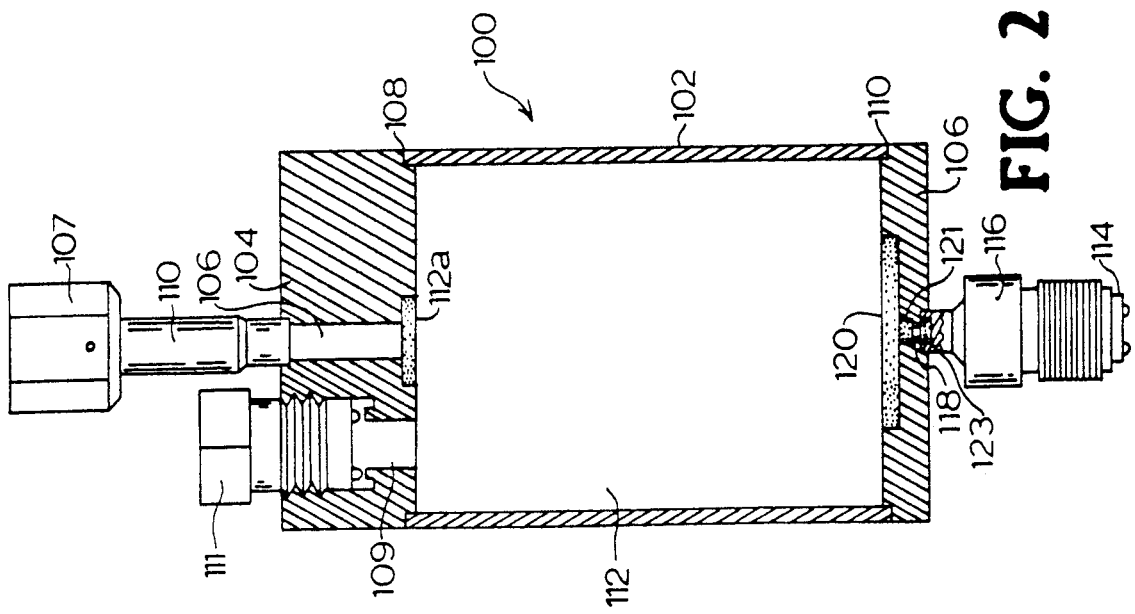
FIG. 2 is an elevation view, in partial cross-section, of a vent gas scrubber apparatus according to one embodiment of the present invention.

FIG. 2 is an elevation view, in partial cross-section, of a gas scrubber apparatus according to one embodiment of the invention, such as may be usefully employed in the semiconductor manufacturing process system shown in FIG. 1, with reference to the purge gas scrubber 40 and the CVD effluent gas scrubber 52.

The scrubber apparatus 100 illustrated in FIG. 2 comprises a cylindrical housing 102, to the upper end of which is leak-tightly joined a first end cap 104. Correspondingly, the lower end of the housing 102 is leak-tightly joined to a second end cap 106. The respective end caps 104 and 106, as well as the cylindrical housing 102, may be formed of any suitable material, such as stainless steel.

At the respective upper and lower joints 108 and 110, the end caps may be joined to the receptacle 102 in any suitable manner providing a leak-tight securement of the respective elements to one another. Although welding is typically employed for such purpose, other joining or bonding means or methods may be employed, as desired.

The resulting vessel construction thus defines an interior volume 112 in which may be disposed a bed (not shown) of a suitable scavenger. At the lower end of the vessel is provided a closure fitting 114, secured to the male nut 116, which in turn is secured to the end cap 106. An inlet port assembly is thereby formed, associated with the influent gas flow passage 118, by means of which gas containing the undesired Group II-VII constituent may be introduced for contacting with the scavenger bed (not shown) disposed in the interior volume 112 of the vessel.

In order to suitably retain the bed solids in the scrubber vessel, and accommodate the pressure drop characteristics of the gas scrubber system, the influent passage 118 may have associated therewith porous elements 120, 121, and 123, which are of suitably porous character to allow flow of the impurity-containing gas mixture into the vessel for treatment therein, while at the same time retaining the particulate scavenger in the contacting vessel. The porous elements 120, 121, 123 may for example comprise wire, mesh, or screen elements of suitable porosity characteristics. Sintered metal frits may advantageously be employed as the porous elements, since such sintered elements can readily be fabricated from a wide variety of materials, including corrosion-resistant materials, with widely varying porosity characteristics.

Correspondingly, the upper end cap 104 comprises an effluent flow passage 106 for egress of impurity-depleted gas mixture from the scavenger vessel. A check valve 110 is joined to the upper end cap 104 as shown, with a female nut 107 being joined in turn to the check valve.

The upper end cap 104 also includes a fill port 109 for introducing scavenger material into the vessel, and removing spent scavenger composition therefrom. The fill port 109 is threaded at its upper extremity to accommodate the positioning therein of a closure plug 111 during the normal use of the scavenger vessel.

In order to prevent by-passing or entrainment loss of particulate solids from the scavenger bed in operation of the scavenger apparatus shown in FIG. 2, a solids retention element 112 is disposed at the inlet of the effluent flow passage 106, suitably being accommodated by a counter-bored recess in the end cap interior surface, as shown. The solids retention element 112 may have a structure similar to that of the aforementioned porous elements 120, 121, and 123, and advantageously may comprise a sintered metal frit.

The scavenger vessel shown in FIG. 2 when not installed for use but filled with scavenger material, is suitably provided with closure fittings at its respective upper and lower ends. Such closure fittings accommodate storage and transport of the scavenger vessel, so that scavenger material therein is not exposed to ambient gases such as otherwise may permeate into the scavenger bed and degrade or otherwise reduce the scavenger effectiveness.

Accordingly, when it is desired to install the scavenger apparatus in the effluent gas lines of the semiconductor manufacturing process system, the closure fittings will be removed from the vessel, and replaced with suitable fittings or coupling means as required for installation in the process system, so that impurity-containing vent gas is effectively flowed to the vessel for contacting with the scavenger therein.

As an example of a commercial embodiment of a scavenger apparatus of the type shown in FIG. 2, the cylindrical housing 102 may be 2.7 inches in height, with an outer diameter of 2.0 inches and a wall thickness of 0.065 inch, the receptacle being formed of 316L stainless steel. The upper and lower end caps 104 and 106 also are of 316L stainless steel construction, each with a diameter of 2.0 inches; the upper cap has a thickness of 0.75 inch and the lower cap has a thickness of 0.25 inch. The diameters of the respective inlet and outlet gas flow passages 118 and 106 are 0.2 and 0.0625 inch. The porous elements 120, 121, and 123 are sintered metal frits of 316L stainless steel, element 123 having a nominal pore size of 2 micrometers, and elements 120 and 121 having a 0.5 micrometer nominal pore size. The solids retention element 112 mounted in the recess of the upper end cap also is constructed of 316L stainless steel, and has an outer diameter of 0.15 inch, with a thickness of 0.065 inch. The nominal pore size of this sintered metal frit is 0.5 micrometer. The upper female nut 107 is a Cajon SS-4-VCR-1 fitting, the male nut is a Cajon SS-4-VCR-4 fitting, and the lower closure fitting 114 is a Martin Technology 2048-W-½ fitting. The check valve 10 is a Martin Technology 2048-W-½ fitting which has been modified to the structure described hereinafter with reference to FIG. 2A hereof.

FIG. 2A is a cross-sectional, elevation view of the check valve 110 employed in the FIG. 2 scavenger vessel. The check valve comprises a valve body 131 which may be of generally cylindrical shape, having an axial flow passage 133 extending through the valve body and defining a cavity 135 therein. The cavity 135 communicates at its lower axial extremity 137 with the inlet flow passage section 139, the inlet flow passage section being of smaller diameter than the cavity 135. At its upper axial extremity, the cavity 135 communicates with an outlet section 141 of the flow passage, which likewise is of reduced diameter as compared to the cavity 135.

In a lower portion 143 of the cavity 135, there is positioned a collar 145 on which is mounted a sealing gasket 147, which may for example be of the conventional 0-ring type. The outlet section 141 of the axial flow passage 133 may be defined by an insert 149 mounted at an upper end of the valve body 131, as shown.

Positioned in the cavity 135 is a spring-biased poppet 151 including a housing comprising an upper housing portion 153, an intermediate housing portion 155, and a housing sealing portion 157. The sealing portion 157 may be formed as a planar disk having a skirt section downwardly extending from its periphery as shown, so that when a zero pressure condition exists in axial flow passage 133, the sealing portion 157 is spring biased by the spring 159 to bear compressively against the sealing gasket 147.

The spring 159 of the poppet has a lower end 161 in contact with the housing upper section 153, while the upper end 163 of the spring is in contact with the insert 149.

In operation, the check valve shown in FIG. 2A is constructed to permit flow therethrough at a selected set point pressure, e.g., 0.5 psig. Below this selected pressure level, the sealing portion 157 of the poppet housing is spring-biased to bear compressively against the sealing gasket 147 to preclude flow through the axial flow passage 133. At flow conditions producing a pressure above the set point pressure value, the poppet housing is forced upwardly in the valve body by compression of spring 159, so that gas entering the axial flow passage 133, in the direction indicated by arrow A, flows consecutively through inlet flow section 139, cavity 135, and discharge section 141.

Figure 3:
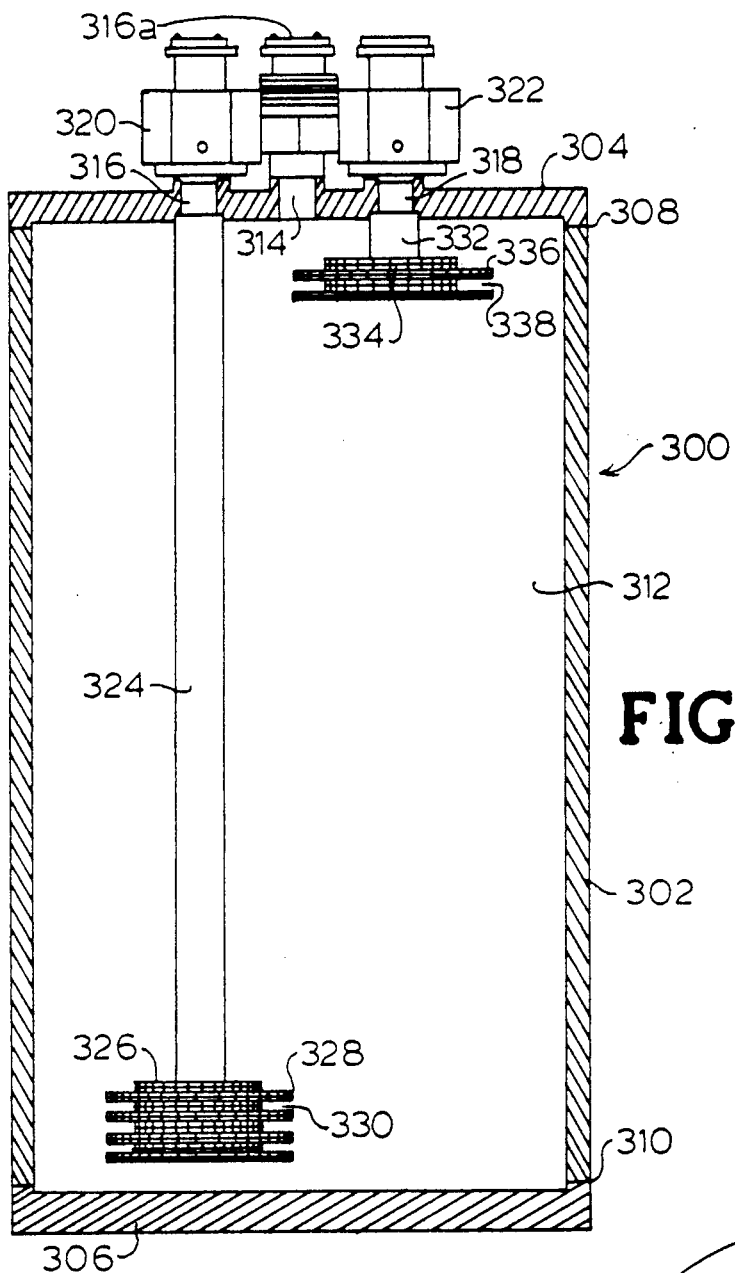
FIG. 3 is an elevation view, in partial cross-section, of a reactor scrubber apparatus, according to one embodiment of the present invention.

FIG. 3 is an elevation view, in partial cross-section, of a reactor scrubber apparatus, according to one embodiment of the present invention. This scavenger vessel may, when appropriately loaded to contain a bed of a suitable scavenger material, provide a safe and effective means for removing Group II-VII constituents from leaking gas cylinders, defective regulators and couplings, etc., as described hereinabove with reference to FIG. 1, wherein a reactor scrubber 56 is shown in operative proximity to the semiconductor reagent source gas means 14.

Referring to FIG. 3, the scrubber apparatus 300 comprises a housing 302 which may be of any suitable shape, but in preferred practice is of cylindrical geometry. At the respective upper and lower ends of the housing 302 are leak-tightly joined end caps 304 and 306. The joint 308 between the housing 302 and upper end cap 304 may suitably be leak-tightly secured, by welding, fusion, or other joining techniques yielding a leak-tight seam at such joint. Correspondingly, the joint 310 between housing 302 and lower end cap 306 may be leak-tightly secured in a similar fashion.

As so constructed, reactor scrubber comprises an interior volume 312 bounded by the housing 302 and respective end caps 304 and 306.

Into this interior volume 312 may be loaded a suitable quantity of an appropriate scavenger composition according to the present invention, to effectively remove the undesired Group II-VII constituents from gas which is contacted with such scavenger composition in the vessel. For this purpose, the scrubber vessel is provided with a fill port 314, on which a closure fitting 316 is provided. This closure fitting may be selectively removed for loading of the scavenger composition to form a bed (not shown) in the interior volume 312 of the vessel, following which the closure fitting may be replaced and thereafter retained in position during the subsequent use of the vessel. After exhaustion of the scavenger, the closure fitting is removed and the vessel emptied of the used scavenger, prior to refilling with fresh scavenger and reapplying the closure fitting to return the vessel to active operability.

The upper end cap 304 of the reactor scrubber vessel also has gas flow openings 316 and 318 defined by associated ports, for the introduction (via opening 316) and discharge (via opening 318) of gas in the operation of the scavenger vessel.

On the inlet port defining gas flow opening 316, there is mounted a closure fitting 320. Correspondingly, on the port defining gas flow discharge opening 318 in the upper end cap 304 of the vessel, there is mounted a closure fitting 322. These respective closure fittings serve the function of isolating the scavenger from the ambient environment during the period that the scavenger vessel is not in active use, thereby avoiding contacting of the contained scavenger with gaseous environmental species which may prematurely consume or degrade the capacity of the scavenger composition for effective gas sorption in subsequent use. Thus, the closure fittings 320 and 322 accommodate the storage and transportation of the scavenger vessel, when it contains a suitable scavenger composition.

Joined in flow communication to the gas flow inlet passage 316 is a gas feed conduit 324. At its upper end, this fee gas conduit may be secured to the upper end cap 304 by a corresponding recess in the end cap which is coaxial with the inlet passage 316 as shown. The gas feed conduit 324 extends downwardly from its juncture with the upper end cap to a lower portion of the interior volume 316 of the vessel, so that gas emanating from a lower end of the feed gas conduit will be introduced into the scavenger bed at a corresponding lower portion thereof, for upflow through the bed.

Mounted at the lower end of the gas feed conduit 324 is a mesh structure 326 for retaining the scavenger composition solids in the bed, and for preventing plugging or other interference with the scavenger bed solids by the influent gas which is contacted with the scavenger.

The mesh structure 326, as described hereinafter in greater detail, is axially accordion-folded to provide an axially spaced sequence of successive folds 328 and cavities 330. This mesh article may be of any suitable mesh material and be characterized by any suitable mesh size, as necessary or desirable to effect the solids retention and anti-plugging functions thereof.

Correspondingly, the effluent gas flow passage 318 is joined in gas flow communication with a gas discharge conduit 332. This conduit may be joined at its upper end to the upper end cap 304, with the conduit being reposed in a suitable end cap recess which is coaxial with the effluent gas flow passage 318. The effluent gas conduit, as well as the aforementioned feed gas conduit 324, may be secured to the upper end cap 304 by simple journaling of these conduits in the associated end cap recesses and/or these conduits may be joined to the upper end cap by any suitable joining method, such as welding, brazing, soldering, etc.

The effluent gas discharge conduit 332 has mounted on its lower end a second mesh structure 334, which is similar to mesh structure 326 in general construction. The second mesh structure 334 comprises an axial spaced sequence of accordion-pleated folds 336 with an intermediate cavity 338 therebetween.

Figure 4:
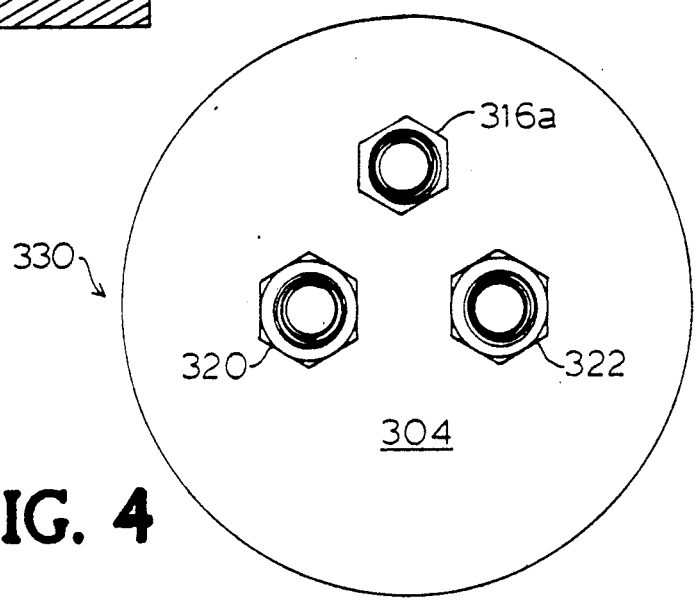
FIG. 4 is a top plan view of the reactor scrubber apparatus shown in FIG. 3.

FIG. 4 is a top plan view of the reactor scrubber vessel 330 which is shown in elevational view in FIG. 3. FIG. 4 shows the top surface of the upper end cap 304, as having mounted thereon the respective closure fittings 316, 320, and 322.

Figure 5:
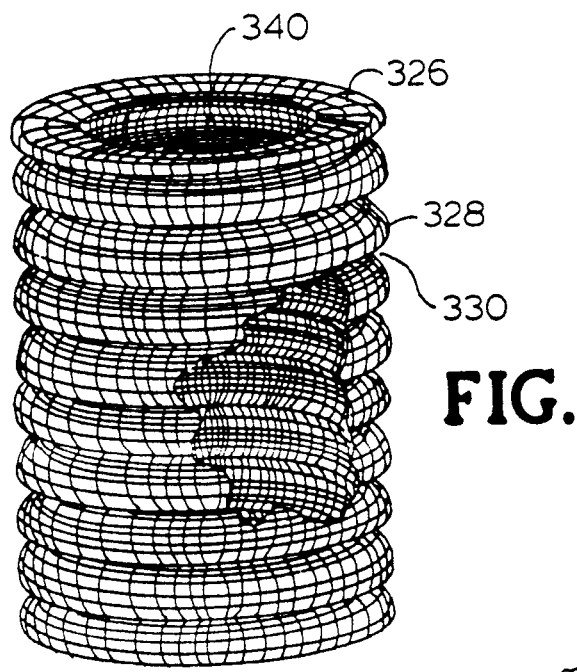
FIG. 5 is a perspective view of the mesh structure employed in the reactor scrubber apparatus of FIGS. 3 and 4.

FIG. 5 is a perspective elevation view, partially broken away to show its interior construction, of the mesh structure 326 which is mounted at the lower end of the gas feed conduit 324 in the scavenger vessel of FIG. 3. The mesh structure 326 is of cylindrical shape and comprises an axial spaced series of folds 328 and cavities 330 in an accordion-pleated configuration. Each of the consecutive folds 328 is generally circumferentially continuous and its exterior wall surfaces bound the adjacent entrant cavities 330.

The mesh structure illustrated suitably may be formed by axial compression of a cylindrical mesh structure, to provide the accordion-pleated structure. At the upper end of the thus-formed article, there is an opening 340 to which the lower end of the gas feed conduit 324 may be joined.

It will be appreciated that by forming a mesh structure in this fashion, utilizing a level of compression which preferably is adequate to effectively flatten the mesh cylinder in to a series of radially extending, circumferentially continuous ridges, and interposed cavities, it is possible to provide an extensive amount of surface area on a unit volume basis. Thus, the accordion-pleated mesh cylinder yields a very dense structure which in application to the scavenger vessel shown in FIG. 3 provides high resistance to solids plugging and by-passing.

As a result of the high surface area to volume characteristics for the bulk structure of the mesh article, it will be appreciated that in some instances it may be desirable to coat the mesh, or indeed to form the mesh, with a material of construction which is scavengingly effective for one or more undesired components of the gas mixture being treated.

In operation of the scavenger vessel shown in FIGS. 3 and 4, gas comprising one or more Group II–VII constituents is introduced into the vessel, subsequent to replacement of the closure fitting 320 with a suitable flow-accommodating fitting, via gas inlet passage 316. From this gas inlet passage, the impurity-containing gas flows downwardly in feed conduit 324 and is dispersed into a lower portion of the scavenger bed (not shown) through the mesh structure 326. The gas mixture then is contacted with the scavenger in the bed, flowing upwardly and entering gas discharge conduit 332 through mesh structure 334, with the mesh structure serving to prevent entrainment and carryover of scavenger solids from the bed. From the gas discharge conduit 332, the impurity-depleted gas flows into gas discharge passage 318 and is discharged from the scavenger vessel by means of a flow-accommodating fitting (not shown) with which closure fitting 322 is replaced before the vessel is placed into active scavenging service.

In use, the respective closure fittings 320 and 322 may be replaced with suitable fittings adapting the scavenger vessel for coupling with a gas cabinet, or gas cylinder. The scavenger composition in the bed is of such capacity and is provided in sufficient quantity to effectively remove the gas by rapid sorption, in the event of gas leakage deriving from a faulty gas cylinder, broken gas regulator, or other occurrences resulting in leakage of gas comprising Group II–VII constituents, and requiring immediate sorption in gross quantities to avert a risk of hazard to persons and/or property in proximity to the such gas leakage.

Thus, it may be desirable to deploy a scavenger vessel of the type shown in FIGS. 3–4 on a mobile cart, with appropriate flow circuitry such as conduits, manifolds, couplings, and the like, so that in a semiconductor manufacturing facility, the cart-mounted scavenger vessel may quickly be transported to the site of a leakage, or other occurrence of bulk environmental quantities of hazardous gas requiring sorptive removal.

In a commercial embodiment of the scavenger vessel shown in FIGS. 3–4, and with reference to the accordion-pleated mesh structure thereof illustrated in FIG. 5, the scrubber vessel may comprise a housing 302 of 316L stainless steel having a 6 inch outer diameter with a wall thickness of 0.25inch. The upper and lower end caps 304 and 306 may each have a thickness of 0.5 inch, and a diameter of 6.0 inches, being formed of the same 316L stainless steel material. The housing 302 may be 10.1 inches in height, with the height of the gas feed conduit 324 being 9.1 inches, and with such conduit having an outer diameter of 0.15 inch and a wall thickness of 0.035 inch. The accordion-pleated mesh structure 326 mounted at the lower end of the gas feed conduit 324 may be formed of a 200 mesh screen material, with the axial pleats each defining a diameter on the order of about 2 inches, and with the mesh structure having a surface area of about 50 square inches. The gas discharge conduit 332 may be formed of 316L stainless steel, having a length of 0.5 inch, an outer diameter of 0.5 inch, and a wall thickness of 0.035 inch. The mesh structure 334 mounted at the lower end of this gas discharge conduit may be formed of a 200 mesh screen. The mesh screen is accordion-folded to provide ridges 336 defining a diameter on the order of about 2 inches, with the mesh structure itself providing an area of about 10 square inches.

The valves 320 and 322 may each be Nupro SS-8-VCR-1 valves, and the closure fittings thereon may comprise Nupro SS-8-VCR-3 fittings. The closure fitting on the scavenger fill port communicating with scavenger fill passage 314 may suitably be a Nupro SS-8-VCR-4 coupling. When the closure fittings are removed from the respective couplings 320 and 322, Nupro SS-CH-VCR-8-⅓ connectors may be suitably joined to the aforementioned Nupro SS-8-VCR-1 fittings.

In the use of the scavenger vessel, of the type shown in FIGS. 3-4, and described with reference to the mesh structure of FIG. 5, for bulk gas removal of gas or gas mixtures comprising Group II-VII constituents, the scavenging reaction may be, and typically is, highly exothermic in character.

Figure 6:
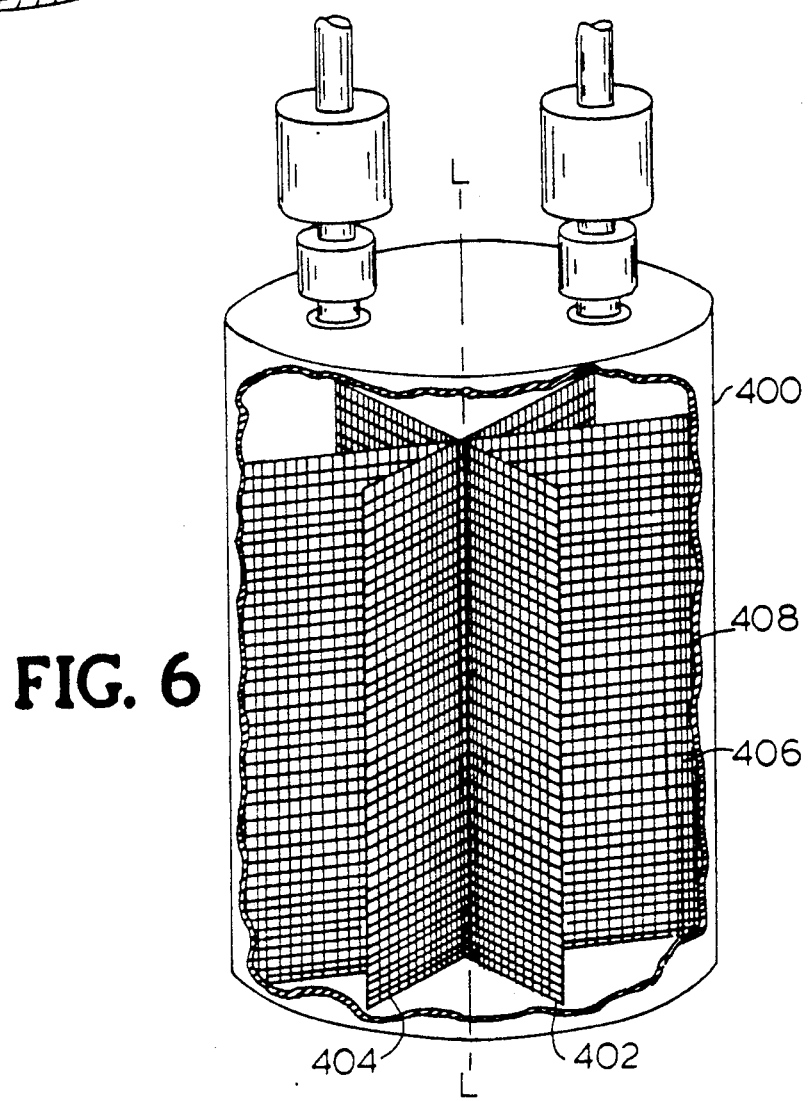
FIG. 6 is a perspective view of a reactor scrubber apparatus according to another embodiment of the invention, wherein a heat transfer structure has been deployed in the bed of scavenger, the vessel being shown partially broken away to illustrate the details of construction of the heat transfer structure.
Figure 7:
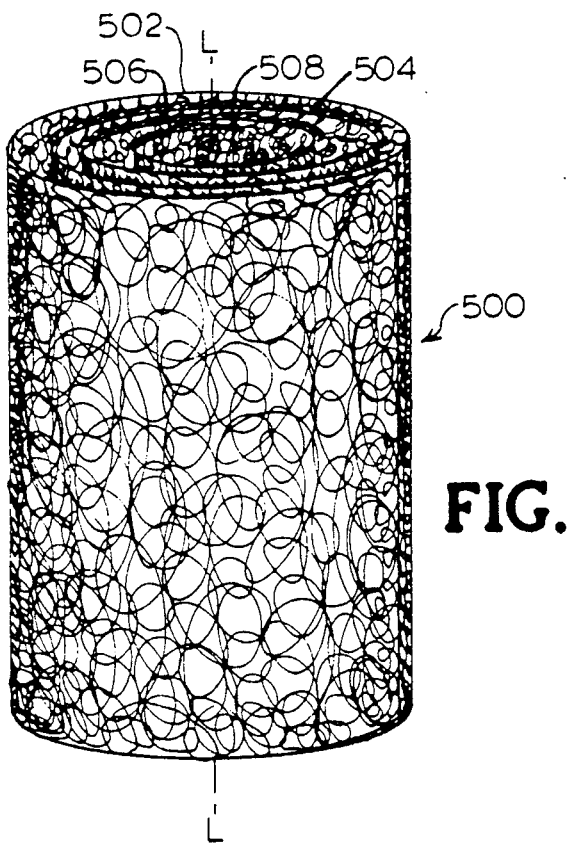
FIG. 7 is a perspective view of another heat transfer structure according to the present invention
Figure 8:
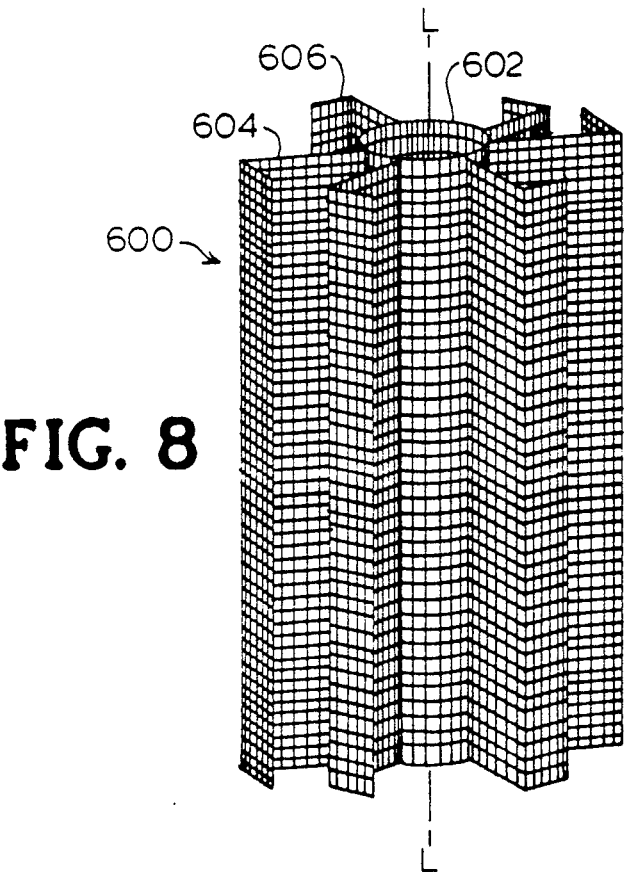
FIG. 8 is a perspective view of a still further heat transfer structure embodiment of the present invention.

Accordingly, depending on the magnitude of such exothermicity, it may be advantageous in the broad practice of the present invention to deploy in the scavenger bed which is employed for bulk removal of Group II-VII constituents from gas mixtures comprising same, a thermal control structure according to the present invention, embodiments of which are variously shown in FIGS. 6-8 hereof.

Each of these thermal control structures is recticulate (i.e., foraminous or perforate) in character and longitudinally continuous, and in transverse cross-section provides sufficient contact with the scavenger in the bed to effectively distribute heat and conduct same axially to dampen what would otherwise constitute a very sharply defined heat transfer front in the scavenger bed.

Such thermal control structures are reticulate for the reason that transverse distribution of flow and equalization of pressure thereby is accommodated, without the occurrence of anomalous flow behavior such as by-passing, short-circuiting, and the like, which might occur in the absence of such reticulate character. The thermal control structure thus may be formed of a mesh, screen, or similar material, or a fiber matrix such as is shown in the thermal control structure of FIG. 7, as hereinafter more fully described.

The mesh size or porosity characteristics of the reticulate thermal control structure will be determined by a balance of the competing considerations of maximizing thermal effectiveness (with an increased amount of material providing increased thermal capacity and conductive material for heat transfer) and the ability to pack the scavenger bed at high packing density, to maximize contact of the scavenger with the gas being treated (larger openings in the thermal control structure accommodating more extensive contact between adjacent particles in the bed, in turn enabling more efficient "nesting" of adjacent particles of the scavenger to take place). The reticulate structure may be formed of any suitable thermally conductive material, preferably a metal such as copper, steel, aluminium, etc. Copper is generally a most preferred material of construction for such heat transfer control structures.

FIG. 6 is a perspective view of a reactor scrubber apparatus 400 according to another embodiment of the invention, wherein the heat transfer structure 402 has been deployed in the interior volume of the vessel, for contact with the bed of scavenger which is installed therein (not shown for clarity). In this view, the scavenger vessel has been partially broken away, to illustrate the details of construction of the heat transfer structure.

As illustrated, the heat transfer structure 402 comprises a series of longitudinally continuous vanes 404, each of which is joined at a common central axis L—L. The respective vanes extend radially outwardly from such axis, to a distance which is generally equal to the inner radius of the vessel housing. In this manner, the peripheral extremities 406 of the respective vanes are in contact with the inner wall surface 408 of the scavenger vessel, along an axial extent of the scavenger vessel preferably corresponding to the height or axial dimension of the scavenger bed therein.

As used in the foregoing context, the term "axially continuous" or "longitudinally continuous" means that the heat transfer article of the invention has a transverse cross-section, perpendicular to the longitudinal axis L—L, which provides substantially the same amount of heat transfer surface along the entire axial extent of the structure. Thus, the heat transfer structure preferably has a transverse cross-section with is substantially identical along the entire axial extent of the structure.

The heat transfer structure shown in FIG. 6 may be formed of corresponding screen or mesh panels which are secured to one another along the central axis to provide a uniform arc length between each of the successive panels in the overall array. In the specific embodiment shown in FIG. 6, the panels are spaced at arc lengths of 60° from one another in the sequence.

In the operation of the scrubber vessel shown in FIG. 6, wherein the mesh structure 402 is reposed in a bed of scavenger material (not shown for clarity), it will be appreciated that the mesh structure will axially dampen the exothermic reaction front, by axially conducting heat away from the reaction zone.

As a result, a substantial improvement in thermal efficiency of the scavenging system is achieved, beyond what would be possible in the absence of such heat transfer control structure.

For example, if a scavenger bed is employed in which the scavenger composition comprises an organometallic scavenger on an alumina pellet support, to remove gross volumes of a hazardous gas such as arsine, the exothermic reaction is confined to a small axial portion of the scavenger bed defined by a thin cross-sectional slice which may be less than about 1 millimeter thick. This thin cross-sectional slice of highly exothermic activity moves from one axial extremity of the scavenger bed to the other, as the active scavenging material on the support is exhausted.

The temperatures of such localized exothermic reaction front typically are on the order of from about 50° C. to about 100° C. for scavenger materials according to the present invention, in the absence of the thermal control structure of the invention. When a thermal control structure is employed, however, it is possible to substantially reduce the temperature rise of the scavenger and the portions of the vessel walls in contact with the reaction front, by as much as a factor of 2-10.

FIG. 7 shows a heat transfer control structure according to another embodiment of the present invention, having a spiral shape when viewed in cross section. The heat transfer article 500 thus is of overall cylindrical shape, comprising a series of turns 502, 504, 506 and 508, which provide for extensive heat transfer contact of the thermal control structure with the scavenger in the bed. The thermal control structure may for example be formed of a non-woven mesh of copper filament, which suitably is inserted in the interior volume of the scrubber vessel, prior to filling same with scavenger material.

FIG. 8 is a perspective view of another thermal control structure according to the present invention. This thermal control structure 600 comprises a central cylindrical mesh body 602, to which are joined a series of circumferentially spaced-apart, radially extending vanes 604. Each of the vanes is tangentially folded at its radially outer extremity, to provide a tangential wall segment 606 for direct contact with the inner surface of the wall defining the housing of the scrubber vessel. Thus, the heat transfer structure 600 is appropriately sized so that it fits snugly in the interior volume of the scrubber vessel, with the tangential surface portions 606 in abuttment with the associated inner wall surface portions of the vessel.

The features and advantages of the present invention are more fully described with respect to the following nonlimiting examples, wherein all parts and percentages are by weight, unless otherwise expressly stated.

EXAMPLE 1

Synthesis of $Bu_2Mg$/Alumina Scavenger

A 1000 ml sample of $Al_2O_3$ (Aldrich Chemical Co., Brockman Activity I neutral 150 mesh) was heated in a $N_2$ stream in a round bottom flask sealed with a rubber septum. The sample bed was heated to 350° C. and this elevated temperature was maintained overnight, following which the sample was cooled under a stream of $N_2$. The large sample was transferred into a $N_2$ atmosphere glove box (Vacuum Atmospheres Corp. (VAC)). A 400 ml aliquot of this material was placed in a 1000 ml Wheaton bottle equipped with a butyl rubber septum. 237 g of 3 wt % Mg solution of $Bu_2Mg$ in hexane was added to the $Al_2O_3$ support. The hexane was removed under a stream of $N_2$ at 85° C. After the removal of bulk hexane was complete, the temperature of the bed was maintained at 85° C. overnight to completely remove the last traces of hexane.

EXAMPLE 2

Synthesis of $Bu_2Mg$/Molecular Sieve Scavenger A 1000 ml sample of 13× molecular sieve was heated in a $N_2$ stream in a round bottom flask sealed with a rubber septum.

The sample bed was heated to 200° C. and this elevated temperature was maintained overnight. The material was cooled under a stream of $N_2$. The large sample was transferred into a $N_2$ atmosphere glove box (VAC). A 400 ml aliquot of this material was placed in a Wheaton bottle equipped with a butyl rubber septum. 237 g of 3 wt % Mg solution of $Bu_2Mg$ in hexane was added to the $Al_2O_3$ support. The hexane was removed under a stream of $N_2$ at 85° C. After the removal of bulk hexane was complete, the temperature of the bed was maintained at 85° C. overnight to completely remove the last traces of hexane.

EXAMPLE 3

Synthesis of BuLi/Alumina Scavenger

A 1000 ml sample of $Al_2O_3$ (Aldrich Chemical Co., Brockman Activity I neutral 150 mesh) was heated in a $N_2$ stream in a round bottom flask sealed with a rubber septum. The sample bed was heated to 350° C. and this elevated temperature was maintained overnight. The sample material was cooled under a stream of $N_2$. The large sample was transferred into a $N_2$ atmosphere glove box (Vacuum Atmospheres Corp. (VAC)). A 400 ml aliquot of this material was placed in a 1000 ml Wheaton bottle equipped with a butyl rubber septum. 5 moles of BuLi in hexane was added to the $Al_2O_3$ support. The hexane was removed under a stream of $N_2$ at 85° C. After the removal of bulk hexane was complete, the temperature of the bed was maintained at 85° C. overnight to completely remove the last traces of hexane.

EXAMPLE 4

Synthesis of BuLi/Alumina Scavenger

A 1000 ml sample of $Al_2O_3$ (Adrich Chemical Co., Brockman Activity I neutral 150 mesh) was heated in a $N_2$ stream in a round bottom flask sealed with a rubber septum. The sample bed was heated to 350° C. and this elevated temperature was maintained overnight. The sample material was cooled under a stream of $N_2$. The large sample was transferred into a $N_2$ atmosphere glove box (Vacuum Atmospheres Corp. (VAC)). A 400 m aliquot of this material was placed in a 1000 ml Wheaton bottle equipped with a butyl rubber septum. 7 moles of BuLi in hexane was added to the $Al_2O_3$ support. The hexane was removed under a stream of $N_2$ at 85° C. After the removal of bulk hexane was complete, the temperature of the bed was maintained at 85° C. overnight to completely remove the last traces of hexane.

EXAMPLE 5

Synthesis of (Na/K)/Alumina Scavenge

A 1000 ml sample of $Al_2O_3$ (Aldrich Chemical Co., Brockman Activity I neutral 150 mesh) was heated in a $N_2$ stream in a round bottom flask sealed with a rubber septum. The sample bed was heated to 200° C. and this elevated temperature was maintained overnight. The sample material was cooled under a stream of $N_2$. The large sample was transferred into a $N_2$ atmosphere glove box (Vacuum Atmospheres Corp. (VAC)). A 50 ml aliquot of this material was placed in a 125 ml Wheaton bottle equipped with a butyl rubber septum. 12.5 g of a 1:5 Na/K alloy mixture was added to the $Al_2O_3$ support. The sample bed was shaken to distribute the alloy over the entire contents.

EXAMPLE 6

Synthesis of poly-Vinylphenol/Alumina Scavenger

A 1000 ml sample of $Al_2O_3$ (Aldrich Chemical Co., Brockman Activity I neutral 150 mesh) was mixed with 50 grams of polyvinylphenol (PolySciences Inc.) in a large Wheaton bottle equipped with a elastomeric serum top. About 500 ml of methanol was added to dissolve the polymer. The methanol was removed in a nitrogen stream at about 85° C. 500 ml of degassed hexane was added to the alumina supported polymer. 1.6 BuLi in hexane was added to deprotonate the polymer. The solvent was removed under a nitrogen stream at 85° C.

EXAMPLE 7

Preparation of Ammonia Scavenger

Amberlyst XN-1010 ion-exchange resin (Rohm and Haas) was dried at 110° C. overnight under a stream of $N_2$. The material was handled thereafter in an $N_2$ atmosphere.

EXAMPLES 8-23

Removal of Hazardous Gases

Samples of the materials produced in Examples 1-7 were variously exposed to a streams of the gases to be removed, in calculational (predictive) and actual empirical tests. The hazardous gas in each case was removed to below levels detectable with a Kitagawa tube (<1 ppm). The flow rates and scavenger capacities for each example are shown in Table II below, wherein the asterisk (*) following the Example number denotes those tests which were calculational and predictive in character.

TABLE II

Removal of Hazardous Gases

| Example | Starting Material, Example No. | Gas | Space Velocity[a] | Capacity[b] |
|---|---|---|---|---|
| 8 | 1 | 10% $AsH_3$ | 600 | 150 |
| 9 | 1 | 100% $AsH_3$ | 600 | 150 |
| 10 | 2 | 10% $AsH_3$ | 600 | 100 |
| 11 | 2 | 100% $AsH_3$ | 600 | 100 |
| 12 | 3 | 10% $AsH_3$ | 600 | 750 |
| 13 | 4 | 100% $AsH_3$ | 1000 | 1000 |
| 14 | 4 | 10% $AsH_3$ | 750 | 1100 |
| 15 | 5 | 100% $AsH_3$ | 600 | 35 |
| 16* | 6 | 10% $SiH_4$ | 600 | 13 |
| 17* | 6 | 100% $SiH_4$ | 600 | 14 |
| 18 | 1 | 100% HCl | 700 | 750 |
| 19* | 3 | 100% $PH_3$ | 600 | 325 |
| 20* | 7 | 100% $NH_3$ | 1000 | 17 |
| 21* | 1 | 100% HF | 700 | 430 |
| 22* | 4 | 100% $SiH_2Cl_2$ | 750 | 800 |
| 23* | 4 | 100% $B_2H_6$ | 600 | 200 |

[a] Volumes of gas per volume of bed per hour.
[b] Grams of material absorbed per liter of bed.
*Values given for Space Velocity and Capacity are predicted; all other values, for Examples not designated by (*), are actual empirical data.

EXAMPLE 24

Description of Vent Gas Scrubber Device

The scrubber device for installation into a gas cabinet is shown in FIG. 2 hereof, and is inserted before the venturi generator. The vessel is filled with an appropriate scavenger of a type such as one of those illustratively described in Examples 1-8.

EXAMPLE 25

Description of Reactor Gas Scrubber

The scavenger device for installation as a bulk gas scrubber for a CVD reactor is shown in FIGS. 3 and 4 hereof, and is inserted after the reactor. It could be used before or after the mechanical vacuum pump, if the reactor is a low pressure unit. The vessel is filled with an appropriate scavenger of a type such as one of those illustratively described in Examples 1-8.

EXAMPLE 26

Thermal Conduction Model for A Thermal Control Structure In A Scavenger Bed

The thermal control structure according to the present invention, in the scavenger system embodiment shown in FIG. 6 hereof, was mathematically modeled, as a cylindrical vessel defined by a stainless steel cannister, containing as the particulate sorbent a scrubber bed of scavenger-coated alumina. In the scavenger bed of this modeled system, is disposed a wire mesh structure similar to that shown in FIG. 6, to conduct heat out of the system.

The wire mesh structure which was modeled consists of rectangular panels of screen which initially are stacked on top of each other, in superposed fashion. The length of each of these rectangular screen panels is substantially equal to the inside height of the cylindrical vessel and the height of the scavenger bed, and the width of the screen panels is substantially equal to the inside diameter of the cylindrical vessel in which the heat transfer structure is reposed.

The screen panels of the modeled system are stapled together along the longitudinal center line of the superposed panels, so that such center line will be coincident with the longitudinal axis of the cylindrical vessel when the heat transfer structure is reposed therein. Once stapled securely, the screens are "fanned out" so that the resulting structure is as shown in FIG. 6, with the stapled longitudinal axis being coincident with the vessel axis L—L. Thus, the heat transfer structure comprises a series of equally circumferentially spaced-apart vanes, radiating outwardly from the central axis of the structure.

Viewed in top plan view, the heat transfer structure defines a circumferential series of pie-shaped sectors, each of which is bounded radially by a pair of adjacent vanes of the screen, with each vane constituting a half-section of the original rectangular panel from which it is derived.

As indicated hereinabove, the heat transfer structure may be variously configured in other shapes and geometries. Regardless of the specific structure employed, a common requirement for such heat transfer structures is that they be in good thermal contact (physical contact) with the interior walls of the vessel containing the scavenger bed.

The heat transfer structure thus may be formed of a mesh or screen, which is physically parameterizable by its mesh size and constituent wire diameter.

Mesh size is the number of wires per lineal inch of screen. In the mathematical modeling, the screen panels are considered to be symmetrical, i.e., the number of wires per lineal inch is the same in both the longitudinal and transverse directions. This assumption is made to facilitate the modelling calculations, but is not required in practice, in that the mesh size may be varied along one or both directions, as well as being of different mesh sizes in each of the respective directions. A practical consideration in choosing mesh size is to achieve a balance between the thermal effectiveness of the screen, and the ease of filling the vessel with scavenger once the screen heat transfer assembly is positioned on the contacting vessel.

The wire diameter employed in the mesh of the heat transfer structure determines the cross-sectional area of the discrete strands in the mesh structure, an important parameter for calculating the thermal conductivity of the overall system comprising such heat transfer structure. The wire diameter is generally specific to, and fixed by, the choice of mesh size.

From a materials standpoint, the material of construction of the heat transfer structure is of importance because the thermal conductivity constant, k, is always specific for any given material.

In the mathematical modelling of the above-described heat transfer structure, three materials of construction were considered for comparison: copper, steel, and aluminum.

The heat transfer structure and associated scavenger vessel has been modeled in a simple fashion, as comprising the aforementioned stainless steel cylindrical vessel, having a volumetric capacity of about 2 gallons, and filled a scavenger comprising an alumina support which is coated with an active chemisorbent such as an organometallic scavenger. The heat transfer system comprising the array of radially extending vanes is positioned in the scavenger bed substantially as shown in the drawing of FIG. 6 hereof. The scavenger vessel is hermetically sealed against the atmosphere and has flow control means including valves, and at least an inlet and an outlet, which permit the introduction of gas into the vessel for contacting with the active scavenger.

Due to the nature of the chemisorption of the Group II-VII constituents from the influent gas, an exothermic reaction takes place, which causes heating of the scavenger bed. Characteristically, the exothermic reaction is confined to a small segment of the bed defined by thin cross-sectional slice less than one millimeter thick therein. This thin cross-sectional slice, or exothermic reaction front, moves slowly from end of the scavenger bed to the other, as the active chemical deposited on the scavenger support becomes exhausted. The thickness of the reacting slice of the bed is always the same and it travels just once down the entire length of the container, so that for practical purposes the heat transfer system and vessel may be thermally modeled by the average position of the exothermic reaction front in the scavenger bed.

By thermal modelling, it is desired to define the ability of the scavenger vessel, including the heat transfer assembly, to move heat energy from its source, i.e., the thin slice of reacting scavenger bed material, to the associated environment comprising the walls of the container and the ambient air surrounding the scavenger vessel. The scavenger vessel and its exterior environment are assumed, for the purpose of modelling, to be in complete equilibrium and to be 100% efficient in thermal transfer. In other words, the scavenger vessel and exterior environment are taken to be an ideal thermal sink.

In the mathematical model, the scavenger bed is considered to be a homogeneous solid consisting of equal parts of void volume and scavenger material (i.e., alumina and some gas).

The wires of the metal screen in the heat transfer structure are assumed to be spaced uniformly through bed as determined by the mesh of the screen and the number of vanes present in the heat transfer structure, with each wire being surrounded by the scavenger material. The junction of any two wires of the mesh is taken to provide an ideal thermal contact, and the junction of the radially outer extremity of each screen vane with the interior wall of the vessel is likewise taken to provide an ideal thermal contact.

The basic equation for heat conduction, i.e., the time rate of transfer from of heat through an object, is fairly simple in form as well as concept. If the rate of thermal transfer is taken to be linearly proportional to the temperature gradient along the length of a object and across its (cross-sectional) area, the heat transfer rate is given by the equation:

$$\frac{\partial Q}{\partial t} = -kA \frac{\partial T}{\partial x} \quad (8)$$

wherein: Q=heatflux; T=temperature; k=thermal conductivity constant; A=cross-sectional area; and x=linear dimension.

By integration of the foregoing equation, there is produced the formula:

$$\frac{\Delta Q}{\Delta t} = kA \frac{(T_2 - T_1)}{L} \quad (9)$$

In the foregoing formula, the proportionality constant k is the coefficient of thermal transfer for the material of interest. In the mathematical model the overall system is considered to comprise objects (e.g., the scavenger bed, or the wire in the mesh of the heat transfer structure) having a given length and which are at a different but constant temperature at each end thereof. The source of heat maintaining the high temperature end in the overall system is the exothermic reaction between the introduced gas and the active scavenger constituent of the scavenger bed. The low end temperature in the overall system is maintained by the heat sink effect of the vessel wall and the exterior environment, and is taken to be 25° C.

To facilitate the mathematical model, a heat transfer coefficient for the bed, $k_{bed}$, is required. In the calculations whose results are hereafter set forth, this heat transfer coefficient is based on an additive relationship for equal parts of void volume gas (air) and alumina (modeled as a mineral solid, such as concrete or glass). The resulting heat transfer coefficient calculated for this equi-partitioned heat transfer matrix is $1.03 \times 10^{-4}$ kcal/sec/meter/degree Centigrade. The total thermal transfer of the system thus is calculated as the sum of the transport of heat by the bed, and the heat transport achieved by the wire mesh heat transfer structure.

Accordingly, the heat transfer process associated with the scavenger vessel was modeled as a heat conduction process in a non-homogeneous cylindrical solid. The scavenger bed was assumed to have the same conductivity as concrete or glass mixed 50:50 with air. The maximum temperature was taken as 250° F., the heat sink environment temperature as 25° F., and the thermal conductivity of the scavenger was taken to be 0.006 kilocalories per centimeter degree Centigrade.

The results of the mathematical modeling are set forth in Table IV, for mesh heat transfer structures of copper, structures of copper, steel, and aluminum. The heat transfer is characterized in the Table by the thermal conductivity of the screen mesh heat transfer structure ("Screen Thermal Conduct"), the total average thermal conductivity of the system, as comprising the vessel, scavenger bed, and heat transfer structure ("Total Average Thermal Conduct"), and the ratio of the total heat transfer in the overall system, to the heat transfer from the bed to the heat sink exterior environment ("Tot/Bed Conduct Ratio").

The calculational data in Table IV demonstrate several interesting trends having implications for the efficient management of the thermal flux and temperature distribution in the scavenger bed system.

First, the scavenger bed alone, without any mesh heat transfer enhancement means (denoted in the table by a zero value for "No. of Vanes"), is a very inefficient heat transfer entity, with a calculated heat transfer flux of only 0.006 kcal/sec. The provision of a heat transfer structure having any number of vanes, and formed of any of the metals previously described, dramatically improves the heat transfer flux in overall system.

The specific metal material chosen for the mesh structure is seen to be very important in terms of the overall heat transfer performance. By examination of thermal conductivity values, k, it is seen that copper is about twice as conductive as aluminum, and is more than eight times as conductive as stainless steel. It is also notable that copper is almost 1,000 times more thermally conductive than the scavenger per se. Thus, the overall system heat transfer, being the sum of the heat transfer flux for the bed and the heat transfer flux for the metal mesh, is largely dominated by the material choice for the metal mesh, even with very low volume fractions of screen present in the scavenger bed.

TABLE IV

THERMAL CONDUCTIVITY SPREAD for GIZMOS

| MAT'L | k (kcal/sec*m*C) | CYLINDER DIA (cm) | CYLINDER Length (cm) | CYLINDER VOL (L) | No. Of VANES | WIRE MESH | WIRE DIA (cm) |
|---|---|---|---|---|---|---|---|
| Copper | 0.092 | 20.3 | 25.4 | 8.2 | 0 | 2 | 0.160 |
| Copper | 0.092 | 20.3 | 25.4 | 8.2 | 2 | 2 | 0.160 |
| Copper | 0.092 | 20.3 | 25.4 | 8.2 | 4 | 2 | 0.160 |
| Copper | 0.092 | 20.3 | 25.4 | 8.2 | 6 | 2 | 0.160 |
| Copper | 0.092 | 20.3 | 25.4 | 8.2 | 8 | 2 | 0.160 |
| Copper | 0.092 | 20.3 | 25.4 | 8.2 | 10 | 2 | 0.160 |
| Copper | 0.092 | 20.3 | 25.4 | 8.2 | 12 | 2 | 0.160 |
| Copper | 0.092 | 20.3 | 25.4 | 8.2 | 14 | 2 | 0.160 |
| Copper | 0.092 | 20.3 | 25.4 | 8.2 | 0 | 4 | 0.119 |
| Copper | 0.092 | 20.3 | 25.4 | 8.2 | 2 | 4 | 0.119 |
| Copper | 0.092 | 20.3 | 25.4 | 8.2 | 4 | 4 | 0.119 |
| Copper | 0.092 | 20.3 | 25.4 | 8.2 | 6 | 4 | 0.119 |
| Copper | 0.092 | 20.3 | 25.4 | 8.2 | 8 | 4 | 0.119 |
| Copper | 0.092 | 20.3 | 25.4 | 8.2 | 10 | 4 | 0.119 |
| Copper | 0.092 | 20.3 | 25.4 | 8.2 | 12 | 4 | 0.119 |
| Copper | 0.092 | 20.3 | 25.4 | 8.2 | 14 | 4 | 0.119 |
| Copper | 0.092 | 20.3 | 25.4 | 8.2 | 16 | 4 | 0.119 |
| Copper | 0.092 | 20.3 | 25.4 | 8.2 | 18 | 4 | 0.119 |
| Copper | 0.092 | 20.3 | 25.4 | 8.2 | 20 | 4 | 0.119 |
| Copper | 0.092 | 20.3 | 25.4 | 8.2 | 0 | 8 | 0.107 |
| Copper | 0.092 | 20.3 | 25.4 | 8.2 | 2 | 8 | 0.107 |
| Copper | 0.092 | 20.3 | 25.4 | 8.2 | 4 | 8 | 0.107 |
| Copper | 0.092 | 20.3 | 25.4 | 8.2 | 6 | 8 | 0.107 |
| Copper | 0.092 | 20.3 | 25.4 | 8.2 | 8 | 8 | 0.107 |
| Copper | 0.092 | 20.3 | 25.4 | 8.2 | 10 | 8 | 0.107 |
| Copper | 0.092 | 20.3 | 25.4 | 8.2 | 12 | 8 | 0.107 |
| Copper | 0.092 | 20.3 | 25.4 | 8.2 | 14 | 8 | 0.107 |
| Steel | 0.011 | 20.3 | 25.4 | 8.2 | 0 | 4 | 0.119 |
| Steel | 0.011 | 20.3 | 25.4 | 8.2 | 2 | 4 | 0.119 |
| Steel | 0.011 | 20.3 | 25.4 | 8.2 | 4 | 4 | 0.119 |
| Steel | 0.011 | 20.3 | 25.4 | 8.2 | 6 | 4 | 0.119 |
| Steel | 0.011 | 20.3 | 25.4 | 8.2 | 8 | 4 | 0.119 |
| Steel | 0.011 | 20.3 | 25.4 | 8.2 | 10 | 4 | 0.119 |
| Steel | 0.011 | 20.3 | 25.4 | 8.2 | 12 | 4 | 0.119 |
| Steel | 0.011 | 20.3 | 25.4 | 8.2 | 14 | 4 | 0.119 |
| Steel | 0.049 | 20.3 | 25.4 | 8.2 | 0 | 4 | 0.119 |
| Steel | 0.049 | 20.3 | 25.4 | 8.2 | 2 | 4 | 0.119 |
| Steel | 0.049 | 20.3 | 25.4 | 8.2 | 4 | 4 | 0.119 |
| Steel | 0.049 | 20.3 | 25.4 | 8.2 | 6 | 4 | 0.119 |
| Steel | 0.049 | 20.3 | 25.4 | 8.2 | 8 | 4 | 0.119 |
| Steel | 0.049 | 20.3 | 25.4 | 8.2 | 10 | 4 | 0.119 |
| Steel | 0.049 | 20.3 | 25.4 | 8.2 | 12 | 4 | 0.119 |
| Steel | 0.049 | 20.3 | 25.4 | 8.2 | 14 | 4 | 0.119 |
| Steel | 0.049 | 20.3 | 25.4 | 8.2 | 16 | 4 | 0.119 |
| Steel | 0.049 | 20.3 | 25.4 | 8.2 | 18 | 4 | 0.119 |
| Steel | 0.049 | 20.3 | 25.4 | 8.2 | 20 | 4 | 0.119 |

| MAT'L | No. Of WIRES | SCREEN AREA (FT2) | SCREEN THERMAL CONDUCT | AVERAGE THERMAL CONDUCT | TOT/BED CONDUCT RATIO |
|---|---|---|---|---|---|
| Copper | 0 | 0.0 | 0.000 | 0.006 | 1.0 |
| Copper | 36 | 0.6 | 0.022 | 0.028 | 4.7 |
| Copper | 72 | 1.1 | 0.043 | 0.049 | 8.3 |
| Copper | 108 | 1.7 | 0.065 | 0.071 | 12.0 |
| Copper | 144 | 2.2 | 0.087 | 0.092 | 15.6 |
| Copper | 180 | 2.8 | 0.108 | 0.114 | 19.3 |
| Copper | 216 | 3.3 | 0.130 | 0.136 | 23.0 |
| Copper | 252 | 3.9 | 0.151 | 0.157 | 26.6 |
| Copper | 0 | 0.0 | 0.000 | 0.006 | 1.0 |
| Copper | 72 | 0.6 | 0.024 | 0.030 | 5.1 |
| Copper | 144 | 1.1 | 0.048 | 0.054 | 9.2 |
| Copper | 216 | 1.7 | 0.072 | 0.078 | 13.2 |
| Copper | 288 | 2.2 | 0.096 | 0.102 | 17.3 |
| Copper | 360 | 2.8 | 0.120 | 0.126 | 21.4 |
| Copper | 432 | 3.3 | 0.144 | 0.150 | 25.5 |
| Copper | 504 | 3.9 | 0.169 | 0.174 | 29.5 |
| Copper | 576 | 4.4 | 0.193 | 0.199 | 33.6 |
| Copper | 648 | 5.0 | 0.217 | 0.223 | 37.7 |
| Copper | 720 | 5.6 | 0.241 | 0.247 | 41.8 |
| Copper | 0 | 0.0 | 0.000 | 0.006 | 1.0 |
| Copper | 144 | 0.6 | 0.038 | 0.044 | 7.5 |
| Copper | 288 | 1.1 | 0.077 | 0.083 | 14.0 |
| Copper | 432 | 1.7 | 0.115 | 0.121 | 20.5 |
| Copper | 576 | 2.2 | 0.154 | 0.160 | 27.0 |
| Copper | 720 | 2.8 | 0.192 | 0.198 | 33.5 |
| Copper | 864 | 3.3 | 0.231 | 0.237 | 40.1 |

TABLE IV-continued
THERMAL CONDUCTIVITY SPREAD for GIZMOS

| | | | | | |
|---|---|---|---|---|---|
| Copper | 1006 | 3.9 | 0.269 | 0.275 | 46.6 |
| Steel | 0 | 0.0 | 0.000 | 0.006 | 1.0 |
| Steel | 72 | 0.6 | 0.003 | 0.009 | 1.5 |
| Steel | 144 | 1.1 | 0.006 | 0.012 | 2.0 |
| Steel | 216 | 1.7 | 0.009 | 0.015 | 2.5 |
| Steel | 288 | 2.2 | 0.012 | 0.017 | 2.9 |
| Steel | 360 | 2.8 | 0.014 | 0.020 | 3.4 |
| Steel | 432 | 3.3 | 0.017 | 0.023 | 3.9 |
| Steel | 504 | 3.9 | 0.020 | 0.026 | 4.4 |
| Steel | 0 | 0.0 | 0.000 | 0.006 | 1.0 |
| Steel | 72 | 0.6 | 0.013 | 0.019 | 3.2 |
| Steel | 144 | 1.1 | 0.026 | 0.032 | 5.3 |
| Steel | 216 | 1.7 | 0.038 | 0.044 | 7.5 |
| Steel | 288 | 2.2 | 0.051 | 0.057 | 9.7 |
| Steel | 360 | 2.8 | 0.064 | 0.070 | 11.9 |
| Steel | 432 | 3.3 | 0.077 | 0.083 | 14.0 |
| Steel | 504 | 3.9 | 0.090 | 0.096 | 16.2 |
| Steel | 576 | 4.4 | 0.103 | 0.109 | 18.4 |
| Steel | 648 | 5.0 | 0.115 | 0.121 | 20.5 |
| Steel | 720 | 5.6 | 0.128 | 0.134 | 22.7 |

Increasing the number of vanes provided by the heat transfer structure increases the rate of heat transfer in the system. In the case of copper mesh, it is seen that for a two mesh screen, each added vane increases the flux provided by the heat transfer structure by about 1.7 kcal/sec. For the four mesh screen, each added vane increases the heat transfer flux by about 2.0 kcal/sec. For the eight mesh screen, each added vane increases the heat transfer flux by about 3.2 kcal/sec. Each of these examples of differing mesh size has a different wire diameter. In all cases, the increased heat transfer flux illustrated by the calculational data reflects an increase in the relative volume fraction of the metal in the heat transfer structure.

Increasing the mesh size of the screen in the heat transfer structure also increases the heat transfer through the overall system. This likewise is due to the corresponding increase in the relative volume fraction of metal in the overall system.

Accordingly, in order to provide an optimal thermal enhancement structure for a scavenger bed, the overall objective is (1) to maximize the volume fraction of metal associated with the heat transfer structure in the scavenger bed, consistent with the requirement of providing a sufficient amount of the scavenger, and (2) to distribute the metal constituent in the heat transfer structure as isotropically as possible throughout the bed.

In the case of a wire mesh screen multivane structure, of the type illustratively shown in FIG. 6 hereof, the following guidelines may be derived from the calculational data set out in Table IV:

- a screen or mesh should be fabricated from a material with a high coefficient of thermal conductivity, such as copper, which exhibits high conductivity and is available at reasonable cost;
- the mesh size chosen should be the highest value which is practically useful in the overall system, with the highest mesh having the smallest openings associated therewith; and
- the number of vanes provided in the multi-vane structure should be maximized to the extent possible without adversely affecting the function of the overall system.

While the invention has been described with reference to specific aspects, features, and embodiments, it will be apparent that numerous variations, modifications, and other embodiments may be employed, and accordingly, all such variations, modifications, and embodiments are to be regarded as being within the spirit and scope of the invention.

What is claimed is:

1. A scavenger composition, comprising a support having associated therewith, or covalently bonded thereto, a polyvinylphenoxy metal compound.

2. A scavenger composition according to claim 1, wherein the metal of the polyvinylphenoxy metal compound is selected from the group consisting of alkali metals and alkaline earth metals.

3. A scavenger composition according to claim 1, wherein the metal of the polyvinylphenoxy metal compound is an alkali metal.

4. A scavenger composition according to claim 1, wherein the metal of the polyvinylphenoxy metal compound is lithium.

5. A scavenger according to claim 1, wherein the support comprises a material(s) selected from the group consisting of alumina, silica, aluminosilicates, kieselguhr, activated carbon, metal fluorides, and fluorocarbon polymers.

6. A scavenger composition according to claim 1, wherein the support comprises alumina.

7. A scavenger composition, comprising a support having associated therewith, or covalently bonded thereto, a sulfonic acid constituent in a form reactive with gaseous ammonia to form a quaternary ammonium complex.

8. A scavenger composition according to claim 7, wherein the sulfonic acid constituent is of the formula $RSO_3H$, wherein R is a monovalent radical or an anchoring moiety.

9. A scavenger composition according to claim 8, wherein R comprises a polymeric backbone structure.

10. A scavenger composition according to claim 7, wherein the support comprises a polystyrene-divinylbenzene resin and the sulfonic acid constituent comprises sulfonic acid or sulfonate anion radicals, as substituents on aromatic rings of said polystyrene-divinylbenzene resin.

11. A scavenger composition according to claim 7, wherein the support comprises material(s) selected from the group consisting of alumina, silica, aluminosilicates, kieselguhr, activated carbon, metal fluorides, and fluorocarbon polymers.

12. A scavenger composition comprising an active scavenging species scavengingly effective for hydrogen fluoride associated with, or covalently bonded to, a support comprising a fluorocarbon polymer.

13. A scavenger composition according to claim 12, wherein said support comprises porous polytetrafluoroethylene.

14. A scavenger composition according to claim 12, wherein the active scavenger species comprises dibutylmagnesium.

15. A scavenger composition according to claim 12, wherein the active scavenger species comprises butyllithium.

16. A scavenger composition according to claim 12, wherein the active scavenger species comprises trialkylaluminum wherein the alkyl substituents may be the same or different and are selected from the group consisting of $C_1$–$C_{12}$ alkyl radicals.

17. A method of treating a gas mixture comprising gaseous compound(s) containing Group II-VII elements, to reduce the concentration of said gaseous compound(s) therein, comprising contacting said gas mixture with a bed of a scavenger composition which is scavengingly effective for said gaseous component(s), at a gas mixture contacting rate of greater than about 1000 volumes of gas mixture per volume of bed per hour,
wherein the scavenger composition comprises a support which is thermally stable to at least 300° C. and has associated therewith, or covalently bonded thereto, organometallic compound(s) selected from the group consisting of compounds of the formulae:
(i)
$RM_1$,
wherein:
R is alkyl; and
M is selected from the group consisting of lithium, sodium, and potassium;
(ii)
$R_{2-a}M_2X_a$,
wherein:
R is alkyl;
M is selected from the group consisting of magnesium and zinc;
X is halide; and
a is a number between 0 and 1, inclusive;
(iii)
$R_{3-b}AlX_b$,
wherein:
R is alkyl;
X is halide; and
b is a number between 0 and 2, inclusive,
wherein the scavenger composition after application of organometallic compounds) to the support has been dried in an inert atmosphere at elevated temperature, with no solvent washing of the scavenger composition after application of organometallic compound(s) to the support.

18. A method according to claim 17, wherein said gaseous compound(s) are selected from the group consisting of:
(i) organic compounds of beryllium, magnesium, zinc, cadmium, and mercury;
(ii) organic compounds of aluminum, gallium, and indium;
(iii) hydrides of boron;
(iv) silane, germane, and chlorosilanes of the formula $SiH_{4-x}Cl_x$, where x is from 1 to 4 inclusive;
(v) hydrides of nitrogen, phosphorous, and arsenic;
(vi) alkylarsines and alkylphosphines;
(vii) alkylselenides and alkyltellurides; and
(ix) hydrogen halides.

19. A method according to claim 17, wherein said gaseous compound(s) are selected from the group consisting of arsine, phosphine, hydrogen chloride, hydrogen fluoride, ammonia, silane, dichlorosilane, and diborane.

20. A process according to claim 17, wherein a critical space velocity is maintained in said contacting, of above about 5,000 volumes gas mixture per volume of scavenger composition per hour.

21. A process according to claim 17, wherein gas mixture contacted with said scavenger composition thereafter is contacted with a second scavenger composition comprising potassium permanganate associated with, or covalently bonded to, a support.

22. A process according to claim 17, wherein said contacting is carried out at a critical space velocity in excess of 1500 volumes gas mixture per volume of scavenger composition per hour, to yield a concentration of said gaseous compound(s) in the contacted gas mixture which is less than 50 parts per billion (ppb).

23. A method for removing arsine and/or phosphine from a gas comprising same, including contracting the gas with a bed of a scavenger composition which is scavenging effected therefor, at a gas contacting rate of greater than about 1000 volumes of gas per volume of bed of the scavenger per hour,
wherein the scavenger composition comprises a support which is thermally stable to at least 300° C. and has associated therewith, or covalently bonded thereto, organometallic compound(s) selected from the group consisting of compounds of the formulae:
(i)
$RM_1$,
wherein:
R is alkyl; and
M is selected from the group consisting of lithium, sodium, and potassium;
(ii)
$R_{2-a}M_2X_a$,
wherein:
R is alkyl;
M is selected from the group consisting of magnesium and zinc;
X is halide; and
a is a number between 0 and 1, inclusive;
(iii)
$R_{3-b}AlX_b$,
wherein:
R is alkyl;
X is halide; and
b is a number between 0 and 2, inclusive,
wherein the scavenger composition after application of organometallic compounds) to the support has been dried in an inert atmosphere at elevated temperature, with no solvent washing of the scavenger composition after application of organometallic compound(s) to the support.

* * * * *

UNITED STATES PATENT AND TRADEMARK OFFICE
CERTIFICATE OF CORRECTION

PATENT NO. : 5,037,624

DATED : August 6, 1991

INVENTOR(S) : G. M. Tom and J. V. McManus

It is certified that error appears in the above-identified patent and that said Letters Patent is hereby corrected as shown below:

On the title page of the patent, after the heading "[75] Inventors:", delete "; Bruce A. Luxon, Stamford".

Column 36, line 61, change "compounds)" to --compound(s)--.

Signed and Sealed this

Twenty-sixth Day of January, 1993

Attest:

STEPHEN G. KUNIN

*Attesting Officer*  Acting Commissioner of Patents and Trademarks